(12) United States Patent
Nicklin

(10) Patent No.: US 10,467,248 B1
(45) Date of Patent: *Nov. 5, 2019

(54) DATA SYNCHRONIZATION USING A COMPOSITE CLOCK

(71) Applicant: Peter John Nicklin, San Jose, CA (US)

(72) Inventor: Peter John Nicklin, San Jose, CA (US)

(73) Assignee: SOFTFRAME, INC., San Jose, CA (US)

( * ) Notice: Subject to any disclaimer, the term of this patent is extended or adjusted under 35 U.S.C. 154(b) by 866 days.

This patent is subject to a terminal disclaimer.

(21) Appl. No.: 14/750,481

(22) Filed: Jun. 25, 2015

Related U.S. Application Data

(63) Continuation of application No. 13/865,045, filed on Apr. 17, 2013, now Pat. No. 9,116,971.

(60) Provisional application No. 61/644,251, filed on May 8, 2012.

(51) Int. Cl.
*G06F 16/27* (2019.01)

(52) U.S. Cl.
CPC .................................. *G06F 16/275* (2019.01)

(58) Field of Classification Search
CPC .......................... G06F 17/30581; G06F 16/275
See application file for complete search history.

(56) References Cited

U.S. PATENT DOCUMENTS

| | | | |
|---|---|---|---|
| 5,710,922 A | 1/1998 | Alley et al. | |
| 5,727,202 A | 3/1998 | Kucala | |
| 5,765,171 A | 6/1998 | Gehani et al. | |
| 5,832,489 A | 11/1998 | Kucala | |
| 5,991,771 A | 11/1999 | Falls et al. | |
| 6,243,705 B1 | 6/2001 | Kucala | |
| 6,247,135 B1 | 6/2001 | Feague | |
| 6,295,541 B1 | 9/2001 | Bodnar et al. | |
| 6,317,754 B1 * | 11/2001 | Peng | G06F 17/30176 707/610 |
| 6,477,545 B1 | 11/2002 | LaRue | |
| 6,633,924 B1 | 10/2003 | Wu et al. | |
| 6,810,405 B1 | 10/2004 | LaRue et al. | |
| 6,859,821 B1 | 2/2005 | Ozzie et al. | |

(Continued)

OTHER PUBLICATIONS www.openmobilealliance.org, "SyncML Sync Protocol, version 1.1", http://technical.openmobilealliance.org/tech/affiliates/syncml/syncml_sync_protocol_v11_20020215.pdf Feb. 15, 2002, pp. 1-62.

(Continued)

*Primary Examiner* — Dawaune A Conyers
(74) *Attorney, Agent, or Firm* — Robert Crownover

(57) ABSTRACT

A synchronization method can include: calculating a maximum anchor; and creating a sync action entry for a data record on a local machine, a data record on a remote machine, or a combination thereof, an action change number set to a greatest change number between a change number for the data record on the local machine and a change number for the data record on the remote machine, and a composite clock number set: to the maximum anchor based on the action change number of the sync action entry being less than the maximum anchor, and to the action change number of the sync action entry based on the action change number of the sync action entry being less than an action change number of a subsequent sync action entry and the action change number of the sync action entry being greater than the maximum anchor.

18 Claims, 20 Drawing Sheets

(56) References Cited

U.S. PATENT DOCUMENTS

| | | |
|---|---|---|
| 6,980,988 B1 | 12/2005 | Demers et al. |
| 7,373,502 B2 | 5/2008 | McGrew |
| 7,490,126 B2 | 2/2009 | Ozzie et al. |
| 7,606,881 B2 | 10/2009 | Chasman et al. |
| 7,680,067 B2 | 3/2010 | Prasad et al. |
| 7,715,444 B2 | 5/2010 | Goyal et al. |
| 7,738,503 B2 | 6/2010 | Goyal et al. |
| 7,783,601 B2 | 8/2010 | Wong et al. |
| 7,860,825 B2 | 12/2010 | Chatterjee et al. |
| 7,899,907 B2 | 3/2011 | Tse et al. |
| 7,991,775 B2 | 8/2011 | MacNaughton et al. |
| 8,005,789 B2 | 8/2011 | Yoon et al. |
| 8,069,144 B2 | 11/2011 | Quinlan et al. |
| 8,126,845 B2 | 2/2012 | Freedman |
| 2005/0198084 A1 | 9/2005 | Kim |
| 2008/0109494 A1 | 5/2008 | Chitre et al. |
| 2008/0162728 A1 | 7/2008 | Robeal et al. |
| 2008/0222212 A1 | 9/2008 | Prasad et al. |
| 2009/0006498 A1 | 1/2009 | Freedman |

OTHER PUBLICATIONS

Cox, Russ et al., "Communication Timestamps for File System Synchronization", Computer Science Group, Harvard University, Published 2001, 10 pages.

Parker, D. Stott et al., "Detection of Mutual Inconsistency in Distributed Systems", IEEE Transactions on Software Engineering, vol. SE-9, No. 3, May 1983, pp. 240-247.

Lamport, Leslie, "Time, Clocks, and the Ordering of Events in a Distributed System", Communications of the ACM, Jul. 1978, vol. 21, No. 7, pp. 558-565.

Mark Bauer, Oracle8i Parallel Server Concepts, Release 2 (8.1.6), Part No. A76968-01, http://docs.oracle.com/cd/A81042_01/DOC/paraserv.816/a76968.pdf, Dec. 1999, p. 6-6, Oracle Corporation, Redwood Shores, California.

Jason Durbin et al., Oracle8 Distributed Database Systems, Release 8.0, Part No. A58247-01, http://docs.oracle.com/cd/A64702_01/doc/server.805/a58247.pdf, Dec. 1997, p. 3-18, Oracle Corporation, Redwood Shores, California.

Lockhart et al., "Infrared Data Association Specifications for Ir Mobile Communications (IrMC)", Mar. 1, 1999.

\* cited by examiner

210L

| UUID | ACTION DATE | ACTION |
|---|---|---|
| A | T4 | UPDATE |
| B | T5 | UPDATE |
| C | T7 | DELETE |
| D | T8 | ADD |

210R

| UUID | ACTION DATE | ACTION |
|---|---|---|
| B | T6 | UPDATE |

| UUID | LAST-MOD DATE | DATA |
|---|---|---|
| A | T4 | D4 |
| B | T6 | D6 |
| D | T8 | D8 |

220R

| UUID | LAST-MOD DATE | DATA |
|---|---|---|
| A | T4 | D4 |
| B | T6 | D6 |
| D | T8 | D8 |

| UUID | CHANGE NUMBER | LAST-MOD DATE | DATA |
|---|---|---|---|
| A | 1 | T1 | D1 |
| B | 2 | T2 | D2 |
| C | 3 | T3 | D3 |
| D | 4 | T4 | D4 |
| E | 5 | T5 | D5 |
| F | 6 | T6 | D6 |
| ⋮ | | | |

| UUID |
|---|
| A |
| B |
| C |
| D |
| E |
| F |
| ⋮ |

| CHANGE NUMBER |
|---|
| 7 |

| LAST-MOD DATE |
|---|
| T7 |

| REMOTE DEVICE NAME | LAST SYNC DATE | STORAGE DEVICE ID | SYNC ANCHOR CHANGE NUMBER |
|---|---|---|---|
| R1 | T8 | RS1 | 7 |
| ⋮ | | | |

| UUID | CHANGE NUMBER | LAST-MOD DATE | DATA |
|---|---|---|---|
| A | 1 | T1 | D1 |
| B | 8 | T14 | D7 |
| C | 3 | T3 | D3 |
| D | 9 | T16 | D9 |
| F | 6 | T6 | D6 |
| G | 11 | T19 | D11 |
| ⋮ | | | |

| UUID |
|---|
| A |
| B |
| C |
| D |
| F |
| G |
| ⋮ |

| CHANGE NUMBER |
|---|
| 12 |

| LAST-MOD DATE |
|---|
| T20 |

| UUID | CHANGE NUMBER | LAST-MOD DATE | DATA |
|------|---------------|---------------|------|
| A | 1 | T8 | D1 |
| B | 2 | T9 | D2 |
| C | 8 | T15 | D8 |
| D | 9 | T17 | D10 |
| E | 5 | T12 | D6 |
| ⋮ | | | |

| UUID |
|------|
| A |
| B |
| C |
| D |
| E |
| ⋮ |

| CHANGE NUMBER |
|---------------|
| 10 |

| LAST-MOD DATE |
|---------------|
| T18 |

| UUID | CHANGE NUMBER | LAST-MOD DATE |
|---|---|---|
| A | 1 | T1 |
| B | 8 | T14 |
| C | 3 | T3 |
| D | 9 | T16 |
| F | 6 | T6 |
| G | 11 | T19 |
| RECORD LIST | 12 | T20 |

| UUID | CHANGE NUMBER | LAST-MOD DATE |
|---|---|---|
| A | 1 | T8 |
| B | 2 | T9 |
| C | 8 | T15 |
| D | 9 | T17 |
| E | 5 | T12 |
| RECORD LIST | 10 | T18 |

FIG. 8b

| UUID | ACN | INSERT HINT | CCN | SYNC ACTION |
|---|---|---|---|---|
| E | 5 | | 7 | REMOTE-DISPOSE |
| F | 6 | | 7 | LOCAL-DISPOSE |
| B | 8 | | 7 | PUSH-REPLACE |
| C | 8 | | 8 | PULL-REPLACE |
| D | 9 | | 9 | PULL-RESOLVE |
| G | 11 | E | 11 | PUSH-INSERT |
| RECORD LIST | 12 | | 12 | PUSH-LIST |

FIG. 9

DATA SYNCHRONIZATION USING A COMPOSITE CLOCK

CROSS REFERENCE TO RELATED APPLICATIONS

This is a Continuation of U.S. patent application Ser. No. 13/865,045 filed Apr. 17, 2013, which claims the benefit of priority to all common subject matter of U.S. Provisional Patent Application Ser. No. 61/644,251 filed May 8, 2012. The content of these applications is incorporated herein by reference.

TECHNICAL FIELD

This application relates to methods for data synchronization.

BACKGROUND

People use various devices to manage information. For example, a person may use a desktop computer to manage a calendar, maintain an address book, and keep a to-do list. The person may also use a laptop computer, a tablet computer, or a smart phone to manage the same information. To be most useful, each device should have the latest version of the information. This can be accomplished by synchronizing the information between the different devices.

People may also share information with others. For example, students may share class notes, and a teacher may publish class assignments on a web site. People can get the latest updates by synchronizing each device.

Data synchronization generally involves detection and identification of changes on each device, together with conflict resolution. Various techniques exist for achieving these aspects of data synchronization, including (1) comparing data records item by item, (2) logging changes made at each device, exchanging logs, and applying changes from each device's log to the other device, and (3) comparing the versions of each data record and choosing the newest version.

To illustrate the prior art technique of synchronizing by comparing data records item by item, FIG. 1a shows a system comprising two exemplary peer devices; local device 110L and remote device 110R. Local device 110L includes a local data store 120L and remote device 110R contains remote data store 120R. FIG. 1b is an example of a local dataset 130L residing in local data store 120L and containing three exemplary data records. Remote dataset 130R is a copy of local dataset 130L residing in remote data store 120R. FIG. 1c shows datasets 140L and 140R after some changes have occurred to datasets 130L and 130R respectively. Record A has changed in local dataset 140L, record B has changed in both datasets 140L and 140R, and record C has been deleted in local dataset 140L. FIG. 1d shows datasets 150L and 150R after data stores 120L and 120R are synchronized. Record A is copied to remote dataset 150R, any conflicts in the changes in record B are resolved and the result is copied to datasets 150L and 150R, and record C is copied back to local dataset 150L. It is readily apparent that item by item record comparison suffers from a number of disadvantages; it gets slower as a dataset grows larger, it depends on the two devices sharing a common clock to find out which record is newer, and it does not handle deletion because it is not possible to tell whether a record has been added to one dataset or deleted from the other dataset after the last synchronization.

To illustrate the prior art technique of synchronizing data using a change log, FIG. 2a shows two exemplary change logs. Change log 210L summarizes the changes to local dataset 130L, and change log 210R summarizes the changes to remote dataset 130R. Change log 210L shows that data records A and B have been updated in local dataset 130L, record C has been deleted, and record D has been added. Change log 210R shows that record B has been updated in remote dataset 130R. FIG. 2b shows datasets 220L and 220R after data stores 120L and 120R are synchronized. Record A is copied to remote dataset 220R, any conflicts in the changes in record B are resolved and the result is copied to datasets 220L and 220R, record C is deleted from remote dataset 220R, and record D is copied to remote dataset 220R. Although the change log technique overcomes the record comparison and deletion disadvantages of the item by item comparison technique, it suffers from two new disadvantages; namely, additional storage for the change log and not knowing when to prune the change log if there are more than two peer devices being synchronized at different times. If a peer device is abandoned, the change log may never be pruned.

To illustrate the prior art technique of synchronizing data by comparing versions of each data record, FIG. 3a is an example of a local dataset 310L residing in local data store 120L and containing three exemplary data records. Remote dataset 310R is a copy of local dataset 310L residing in remote data store 120R. Each record is marked by a "version vector", a pair of version numbers,{L1,R1}, corresponding to record versions in the data stores of devices 110L and 110R. FIG. 3b shows datasets 320L and 320R after some changes have occurred to datasets 310L and 310R respectively. Record A has changed in local dataset 320L, record B has changed in both datasets 320L and 320R, and record C has been deleted in local dataset 320L. FIG. 3c shows datasets 330L and 330R after data stores 120L and 120R are synchronized. Record A is copied to remote dataset 330R, any conflicts in the changes in record B are resolved and the result is copied to dataset 330L and 330R, and record C is deleted from remote dataset 330R. Although the version comparison technique overcomes the disadvantages of record comparison and deletion as well as the overhead of a change log, each time a new peer device is introduced the version vector of each data record grows because it must store the version for the new device. Even when a device is abandoned, the version vector retains the version number of the abandoned device.

Additionally, none of the techniques described above handles an interrupted synchronization intrinsically. A synchronization operation between two devices may be interrupted for a variety of reasons. For example, the user may manually abort the synchronization operation to perform an urgent task, one of the devices may lose power unexpectedly, or the devices may move outside wireless range and lose connectivity. In general, an interrupted synchronization means restarting the synchronization from scratch, or requires additional information about the synchronization state for later restart.

Prior developments have not taught or suggested any solutions to overcome all of the limitations described above, and thus, solutions to overcome these limitations have long eluded those skilled in the art.

SUMMARY

The claimed invention is directed to methods, computer readable media, and systems for synchronizing shared data stored on multiple devices between or among the devices. Among the many different possibilities contemplated, a maximum anchor and an action change number can be utilized to fix a composite clock number to support partial synchronization transactions.

It is further contemplated that the composite clock number can be used to set the sync anchor change number after a synchronization transaction and that a sync action entry can be sorted by an action change number. It is further contemplated that a bi-directional sync action queue or a one-way sync action queue can be created. It is further contemplated that a sync action entry includes a greatest change number calculated between an entry in a local sync list and a remote sync list for a data record being synchronized It is further contemplated that a sync processor synchronizes two data stores. If the sync processor determines that one or both data stores have been modified since the last synchronization, it creates a sync action queue for synchronizing one or both data stores. Each entry in the sync action queue contains instructions for creating, modifying, or deleting a data record in a data store. After sorting the sync action queue in ascending order from the oldest change to the newest, the sync processor sets a composite clock number for each queue entry. The composite clock number provides the starting point for the next synchronization of the two data stores irrespective of whether the synchronization process is interrupted or completes normally. After the sync processor performs each sync action, it records the composite clock number in a sync anchor table.

It is further contemplated that if each data store contains a list of sorted records, an optional action in the sync action queue synchronizes the lists so that the records in each data store are presented in the same order.

Advantages

Accordingly, it has been discovered that the composite change clock can provide several advantages in various embodiments, such as:

One or more embodiments permit unlimited copying and synchronizing of information among multiple peer devices.

One or more embodiments are efficient in terms of storage space and have minimal storage overhead to accommodate devices with limited memory regardless of the number of peer devices and allows for a more dynamic synchronization requiring less stored or tracked information because a change number is only required to track changes to local information and it is not necessary to store information about the local information as well as the remote information. The composite change clock also allows for a sync anchor to be stored locally and only recording the synchronizations that the specific machine has been involved in.

One or more embodiments minimize the duration of synchronization so that the likelihood of interruption is reduced and synchronization can be initiated frequently on devices with limited processing power.

One or more embodiments eliminate a need for a common system clock shared by multiple peer devices and can function with multiple independent clocks implemented on different systems without coordinating the multiple clocks.

One or more embodiments succeed even when syncing is interrupted before the data stores have been fully synchronized. The synchronization process may be resumed without a need to repair or redo any of the work prior to the interruption. The synchronization process may also be resumed without tracking the actions that were not completed when previously interrupted.

One or more embodiments synchronize the data even if the data store on one device is immutable. An exemplary immutable device may be a CD-ROM or DVD. Another exemplary device may be a shared read-only data store residing in a cloud storage device. One or more embodiments allow peer devices to be abandoned at any time without leaving residual data behind pertaining to the abandoned device.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The invention is illustrated in the figures of the accompanying drawings which are meant to be exemplary and not limiting, in which like reference numerals are intended to refer to like components, and in which:

FIG. 2a illustrates a prior art synchronization technique using change logs.

FIG. 2b shows local and remote datasets of FIG. 1b after applying the change logs of FIG. 2a.

FIG. 6a is an example of a local dataset in one embodiment.

FIG. 6b is an example of a local record list in one embodiment

FIG. 6c is an example of a sync anchor table in one embodiment

FIG. 7a is an example of a local dataset in one embodiment that has been modified since the last synchronization.

FIG. 7b is an example of a local record list in one embodiment that has been modified since the last synchronization.

FIG. 7c is an example of a remote dataset in one embodiment that has been modified since the last synchronization.

FIG. 7d is an example of a remote record list in one embodiment that has been modified since the last synchronization.

FIG. 8a is an example of a sync list for a local data store in one embodiment.

FIG. 8b is an example of a sync list for a remote data store in one embodiment.

FIG. 9 is an example of a sync action queue in one embodiment

DETAILED DESCRIPTION

In the following description of the preferred embodiments, reference is made to the accompanying drawings that form a part hereof, and in which are shown by way of illustration, preferred embodiments in which the invention may be practiced. It is to be understood that other embodiments may be utilized and changes may be made without departing from the scope of the present invention.

The following preferred embodiments are described in sufficient detail to enable those skilled in the art to make and use the invention and provide numerous specific details to give a thorough understanding of the invention; however, it will be apparent that the invention may be practiced without these specific details. In order to avoid obscuring the present invention, some well-known circuits, system configurations, and process steps are not disclosed in detail.

As used herein, the term change number is defined as a scalar value for tracking changes in one replica of a single data record and differs from a version vector in that a version vector tracks changes in multiple replicas of a single data record on a distributed system.

Figures 1A, 1B, 1C, 1D:
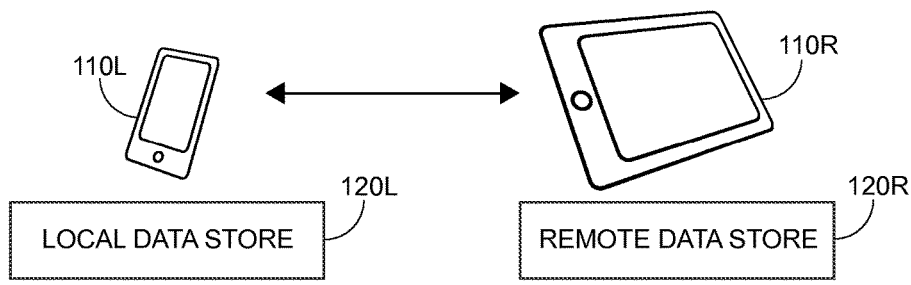
FIG. 1a shows a prior art system comprising two exemplary peer devices.
FIG. 1b illustrates a prior art synchronization technique using an example of local and remote datasets to compare data records item by item.
FIG. 1c shows local and remote datasets of FIG. 1b after some changes.
FIG. 1d shows local and remote datasets of FIG. 1c after synchronization.
Figure 3A:
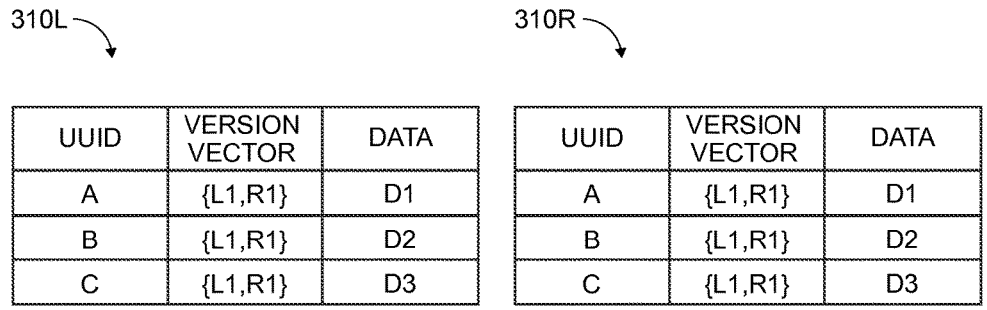
FIG. 3a illustrates a prior art synchronization technique using an example comparing versions of data records in local and remote datasets.
Figure 3B:
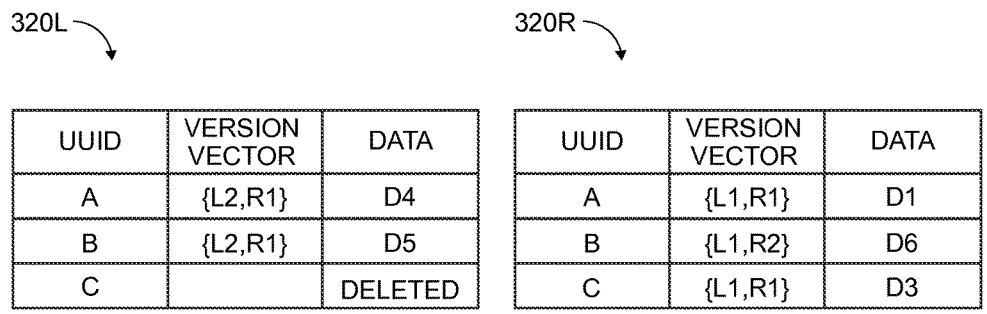
FIG. 3b shows local and remote datasets of FIG. 3a after some changes.
Figure 3C:
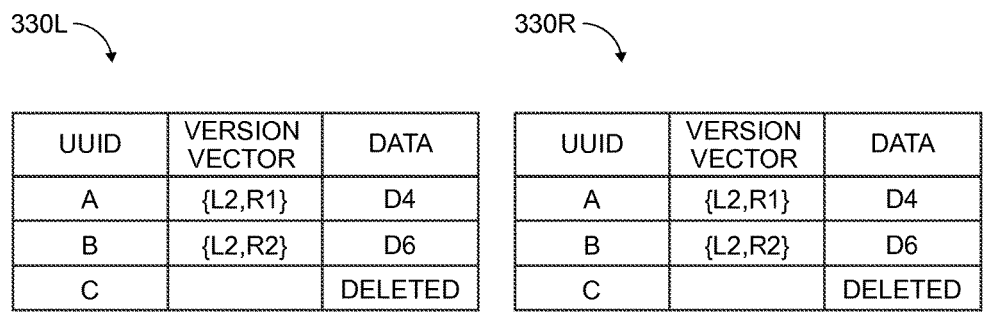
FIG. 3c shows local and remote datasets of FIG. 3b after synchronization.
Figure 4:
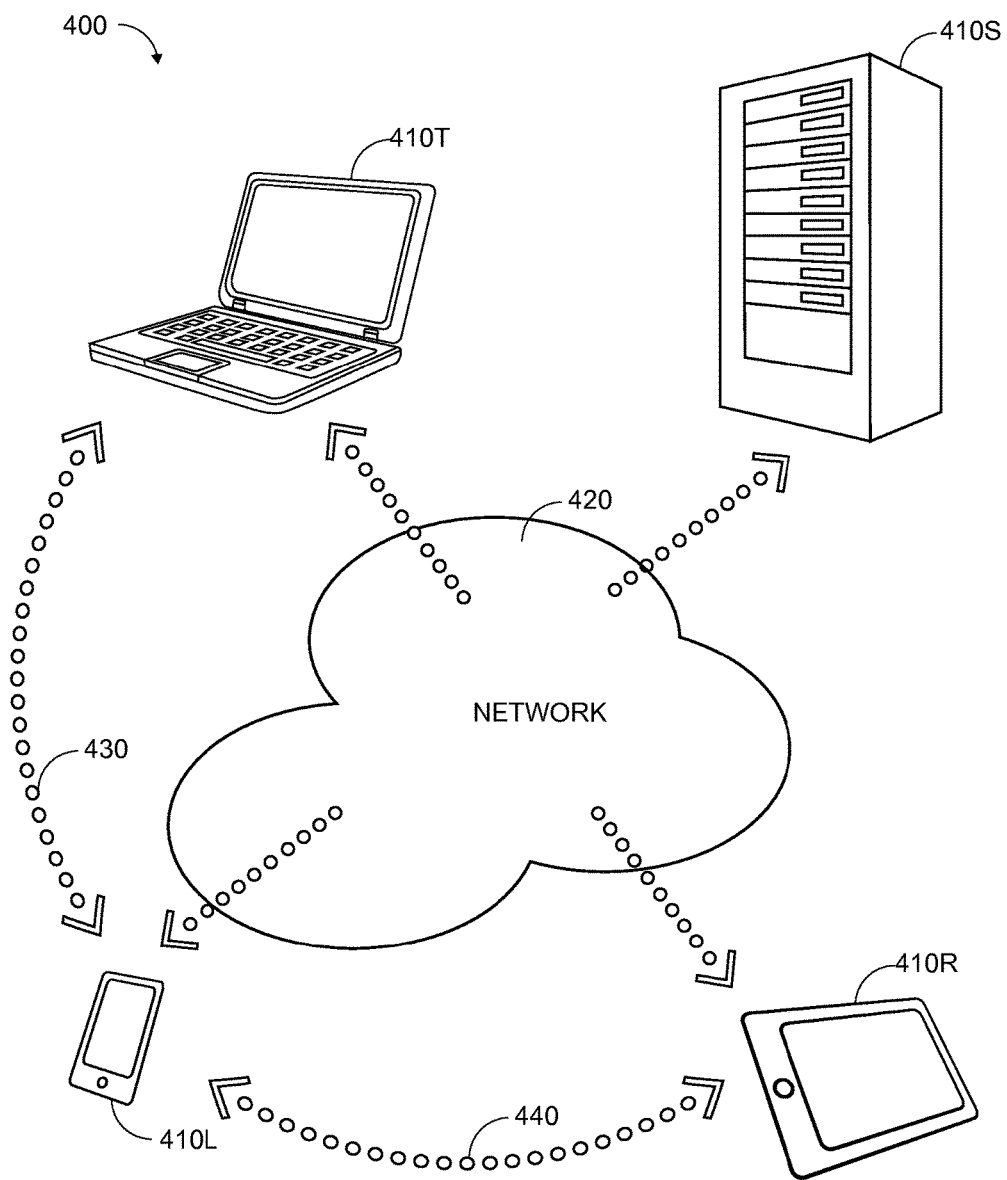
FIG. 4 illustrates one embodiment of a system for synchronizing data between devices.

Embodiments of the invention allow shared data stored on multiple devices to be synchronized between or among the devices. One embodiment of a system 400 for synchronizing data between devices is illustrated in FIG. 4. For purposes of illustration FIG. 4 shows the system 400 comprising four devices; device L 410L, device R 410R, device S 410S, and device T 410T; however, the system 400 may include any number of devices. Each device includes data storage capabilities for storing data shared between each other. The system 400 further comprises a shared network 420 allowing device L 410L, device R 410R, device S 410S, and device T 410T to communicate with each other. The system 400 further comprises an ad-hoc wireless network 430 connecting device L 410L and device T 410T, and an ad-hoc network 440 connecting device L 410L and device R 410R. Ad-hoc networks are commonly used when data needs to be shared between two devices but there is no shared network available such as the Internet or a local area network (LAN).

Figure 5:
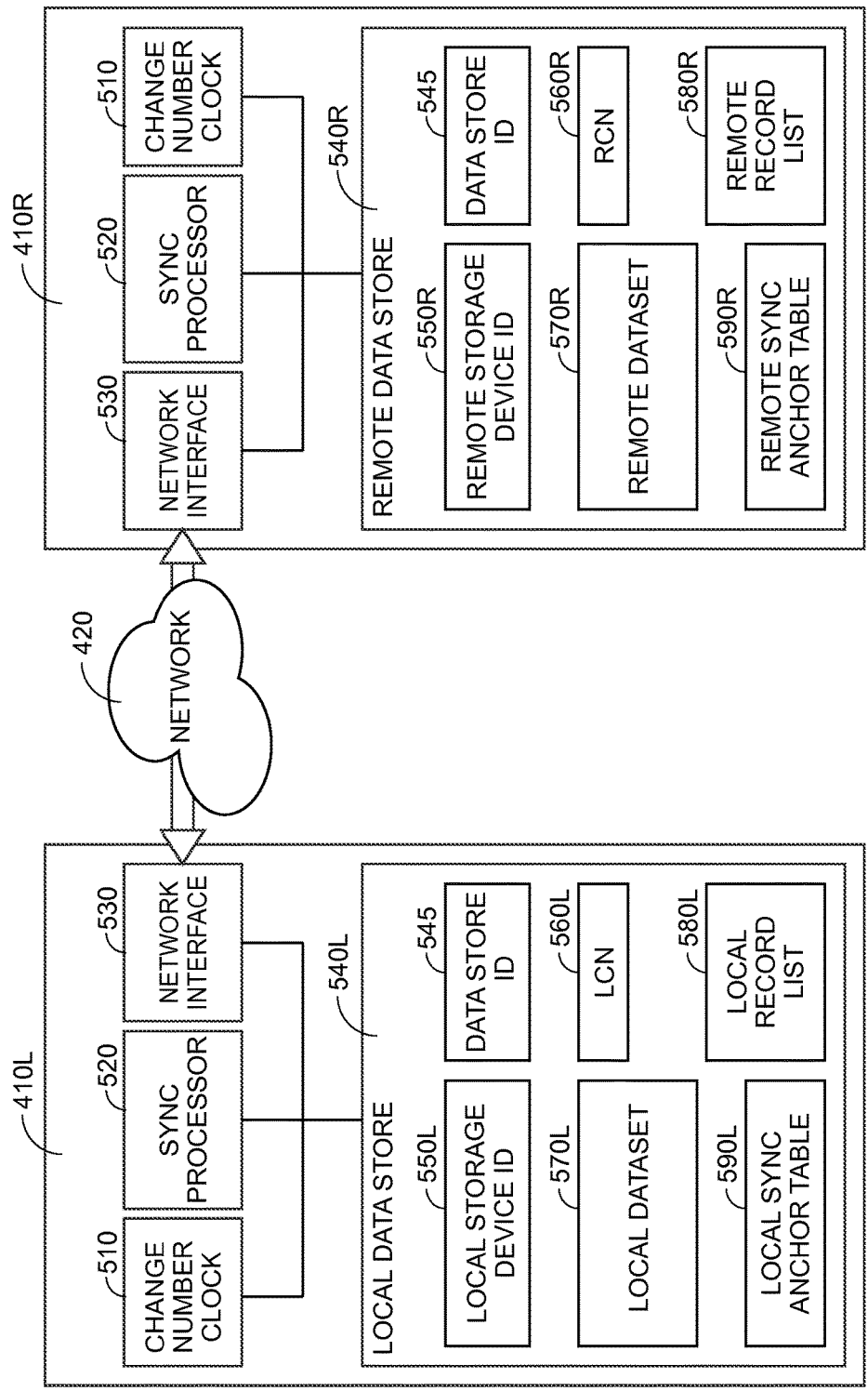
FIG. 5 is a block diagram illustrating two exemplary peer devices connected by a network in one embodiment.

FIG. 5 is a block diagram illustrating two exemplary peer devices 410L and 410R connected by a network 420 in one embodiment. Device L 410L includes a change number clock 510, sync processor 520, network interface 530, and at least one local data store 540L residing in a non-transitory computer-readable storage medium. Device R 410R includes a change number clock 510, sync processor 520, network interface 530, and at least one remote data store 540R residing in a non-transitory computer-readable storage medium. Device L 410L is designated as a local peer device and device R 410R is designated as a remote peer device. For descriptive clarity, reference numbers with an L suffix refer to parts of the local peer device and reference numbers with an R suffix refer to parts of the remote peer device. The local peer device is the device that initiates synchronization of data between data stores 540L and 540R.

Change number clock 510 generates a new change number 615 of FIG. 6a each time a data record 602 of FIG. 6a is added, modified, or deleted in a data store. In the present embodiment, change numbers 615 always increase in value and are never reused. It is also contemplated that change numbers may increase in magnitude but decrease in value, or may follow a preset pattern when identifying changes to the data record 602. The numbering scheme for generating the change numbers 615 on the device L 410L and device R 410R do not need to be the same. Further, the change numbers 615 for corresponding data records 602 on both the device L 410L and device R 410R can be the same and are not required to be unique or monotonically created. Sync processor 520 synchronizes the data between data stores 540L and 540R. Change number clock 510 and sync processor 520 may be implemented in a variety of ways including special purpose hardware, firmware, or application software.

Local data store 540L includes a local storage device identifier 550L, a data store identifier 545, a local clock number (LCN 560L), a local dataset 570L comprising data records 602 that will be shared with remote dataset 570R, an optional local record list 580L, and a local sync anchor table 590L. Local storage device identifier 550L is an identifier that is unique to the non-transitory computer-readable storage medium that stores local data store 540L. Data store identifier 545 is a universally unique number, often implemented as a 128-bit random number. Because devices 410L and 410R may each include more than one data store 540, data store identifier 545 identifies which two data stores 540 need to be synchronized. LCN 560L is the change number 615 or record list change number 630 of FIG. 6b of the most recent change in the data stored in local dataset 570L or local record list 580L, respectively. Whenever a user changes data or as a result of synchronization, LCN 560L is updated to the greatest change number 615 in local dataset 570L or record list change number 630 in local record list 580L. Optional local record list 580L provides a way of maintaining the data records 602 in local dataset 570L if they need to be presented in sorted order. Local sync anchor table 590L contains zero or more sync anchors 604 of FIG. 6c. A sync anchor 604 of FIG. 6c records the composite clock number 940 of FIG. 9 corresponding to the most recent sync action 950 of FIG. 9 applied to a data store 540. Remote data store 540R includes similar parts, but with suffix R instead.

The data requirements described with regard to FIG. 6a through FIG. 9 as well as the data requirements for the flow charts of FIG. 10 through FIG. 18 can be fixed on or saved within non-transitory computer-readable media. These data requirements cannot be accessed or modified without the use and implementation of hardware and changes in data values can represent physical, non-transitory transformations of hardware records in the form of bits.

FIG. 6a is an example of a local dataset 570L in one embodiment. Local dataset 570L includes six exemplary data records 602, each of which is identified by a universally unique identifier (UUID 610), often implemented as a 128-bit random number. Each data record 602 in local dataset 570L also includes a change number 615, a date 620 that the data record 602 was last created or modified, and data 625. As each data record 602 is added or modified, change number clock 510 of FIG. 5 provides a new change number 615 for the data record 602. The device R 410R and the device L 410L can include respective change number clock 510 that independently set the change number 615 of the data records 602 residing thereon. The change number clock 510 on the device R 410R and device L 410L do not need to be coordinated but can operate to set the change numbers 615 of the local and remote data records 602 completely independently. The last-modified date 620 is only used for conflict resolution if the same data record 602 has been changed in both datasets 570L and 570R of FIG. 5 since the last synchronization. For purposes of illustration, the UUID 610 of each exemplary data record 602 is identified with an alphabetical letter rather than a universally unique random number.

FIG. 6b is an example of a local record list 580L in one embodiment. Local record list 580L includes six UUIDs 610 that correspond to the exemplary data records 602 in local dataset 570L of FIG. 6a. Local record list 580L also includes a record list change number 630 and the last modified record list date 635 that the record list 580 was last modified. The last-modified record list date 635 is only used for conflict resolution if record lists 580L and 580R of FIG. 5 have both been changed since the last synchronization.

FIG. 6c is an example of a local sync anchor table 590L comprising zero or more sync anchors 604 in one embodiment. Each sync anchor 604 in local sync anchor table 590L includes sync anchor change number 660 for the most recent synchronization between local data store 540L of FIG. 5 and remote data store 540R of FIG. 5 on a non-transitory computer-readable storage medium identified by storage device identifier 650. Each sync anchor 604 in local sync anchor table 590L also includes remote device name 640 and the date of the last synchronization as a last sync date 645 for informational purposes only.

After local data store 540L is synchronized with remote data store 540R, the data records 602 in remote dataset 570R of FIG. 5 and remote record list 580R of FIG. 5 will have matching change numbers 615 and 630 respectively, and sync anchor change number 660 will be set to the composite clock number 940 of FIG. 9 in local data store 540L. The sync anchor 604 is only recorded in the sync anchor table 590 of the device that initiates the synchronization.

FIG. 7a is an example of a local dataset 570L in one embodiment that has been modified since the last synchronization. Exemplary data records 602 B and D have been modified and have different change numbers 615 and last-modified dates 620, exemplary data record 602 E has been deleted, and exemplary data record 602 G has been added.

FIG. 7b is an example of a local record list 580L in one embodiment that has been modified since the last synchronization. Exemplary data record 602 E has been deleted and exemplary data record 602 G has been added. Record list change number 630 and last-modified record list date 635 of the local record list 580L has changed.

FIG. 7c is an example of a remote dataset 570R in one embodiment that has been modified since the last synchronization. Exemplary data records 602 C and D have been modified and have different change numbers 615 and last-modified dates 620, and exemplary data record 602 F has been deleted.

FIG. 7d is an example of a remote record list 580R in one embodiment that has been modified since the last synchronization. Exemplary data record 602 F has been deleted. Record list change number 630 and last-modified record list date 635 of the remote record list 580R has changed.

FIG. 8a is an example of a local sync list 800L for a local data store 540L in one embodiment. The local sync list 800L is created by the sync processor 520 of FIG. 5 in step 1110 of FIG. 11 and contains a list of entries 810 corresponding to the data records 602 of FIG. 7a in the local dataset 570L of FIG. 7a from the local data store 540L of FIG. 5. Each entry 810 includes a UUID 610, a change number 615, and a last-modified date 620. Local sync list 800L may also include an entry 820 for the local record list 580L of FIG. 7b with a record list change number 630 and last-modified record date 635 if the local record list 580L exists. The exemplary entries 810 and 820 in FIG. 8a reflect the exemplary data records 602 in local dataset 570L and local record list 580L.

FIG. 8b is an example of a remote sync list 800R for a remote data store 540R in one embodiment. The remote sync list 800R is created by the sync processor 520 of FIG. 5 in step 1115 of FIG. 11 and contains a list of entries 810 corresponding to the data records 602 of FIG. 7c in the remote dataset 570R of FIG. 7c from the remote data store 540R of FIG. 5. Each entry 810 includes a UUID 610, a change number 615, and a last-modified date 620. Remote sync list 800R may also include an entry 820 for a remote record list 580R of FIG. 7d with a record list change number 630 and last-modified record date 635 if the remote record list 580R exists. The exemplary entries 810 and 820 in FIG. 8b reflect the exemplary data records 602 in remote dataset 570R and remote record list 580R.

FIG. 9 is an example of a sync action queue 900 in one embodiment. The sync processor 520 of FIG. 5 combines information from sync lists 800L and 800R to create a sync action queue 900 in step 1030 of FIG. 10. The sync action queue 900 contains instructions to synchronize local dataset 570L of FIG. 5 and local record list 580L of FIG. 5 with remote dataset 570R of FIG. 5 and remote record list 580R of FIG. 5, respectively. Each sync action entry 960 contains a UUID 610, an action change number (ACN 920), an insertion hint 930 for data records 602 of FIG. 6 that need to be inserted into a data store 540 of FIG. 5, a composite clock number (CCN 940), and a sync action 950. ACN 920 is the greatest change number 615 of FIG. 6 between an entry 810 originating in local sync list 800L of FIG. 8a and originating in remote sync list 800R of FIG. 8b for the data record 602 being synchronized. The ACN 920 can also be the greatest record list change number 630 of FIG. 6 between an entry 820 originating in local sync list 800L and originating in remote sync list 800R for the record list 580 of FIG. 5 being synchronized. The change number 615 or the record list change number 630 themselves contain values originating from a change in a single record autonomously from any changes in data on another machine, in other words, not originating from a synchronization event although the change number 615 and the record list change number 630 may be later used elsewhere such as in the ACN 920. The sync action entries 960 are sorted into ascending order of ACN 920 before the CCN 940 is set in step 1155 of FIG. 11. The ACN 920 of current sync action entry 960 can be identical to the ACN 920 of a previous sync action entry 960 when change numbers 615 originating on a separate device are combined. The CCN 940 is used in step 1050 of FIG. 10 to update sync anchor change number 660 of FIG. 6c in local sync anchor table 590L of FIG. 5 after each sync action is performed. Insertion hint 930 is the UUID 610 of the data record 602 that should come just before the data record 602 being inserted if the data records 602 need to be presented in sorted order. For example, exemplary data record 602 G in FIG. 9 should be inserted in remote data store 540R just after data record 602 E.

The following ten sync actions 950 may be used to synchronize two data stores.

1. Sync action PULL-INSERT copies a data record 602 from remote dataset 570R and inserts it in local dataset 570L.
2. Sync action PUSH-INSERT copies a data record 602 from local dataset 570L and inserts it in remote dataset 570R.
3. Sync action PULL-REPLACE copies a data record 602 from remote dataset 570R and replaces the data record 602 with the matching UUID 610 in local dataset 570L.
4. Sync action PUSH-REPLACE copies a data record 602 from local dataset 570L and replaces the data record 602 with the matching UUID 610 in remote dataset 570R.
5. Sync action PULL-RESOLVE copies a data record 602 from remote dataset 570R and replaces the data record 602 with matching UUID 610 in local dataset 570L after applying conflict resolution.
6. Sync action PUSH-RESOLVE copies a data record 602 from local dataset 570L and replaces the data record 602 with matching UUID 610 in remote dataset 570R after applying conflict resolution.
7. Sync action LOCAL-DISPOSE removes a data record 602 from local dataset 570L.
8. Sync action REMOTE-DISPOSE removes a data record 602 from remote dataset 570R.
9. Sync action PULL-LIST copies remote record list 580R to local data store 540L and replaces local record list 580L.
10. Sync action PUSH-LIST copies local record list 580L to remote data store 540R and replaces remote record list 580R.

Operation

Having described the data requirements for synchronizing a data store between two devices, we now describe the process for synchronizing the data stores. The process steps for synchronizing the data stores, in the flow charts described with regard to FIG. 10 through FIG. 18, can be implemented in hardware, software, firmware, or any combination thereof. Furthermore, the step boundaries commonly vary and functions are implemented together, as well as separately in different embodiments. The synchronization process comprises three stages. The first stage checks to see if the data stores need to be synchronized. If the data stores need to be synchronized, the second stage creates a sync action queue 900 with actions for synchronizing the data stores, and the third stage performs the actions in the sync action queue 900. We use two exemplary devices, device L 410L and device R 410R of FIG. 4, to illustrate each stage in one embodiment of the synchronization process. It is understood that sync processor 520 associated with each exemplary device performs each step of the process.

Figure 10:
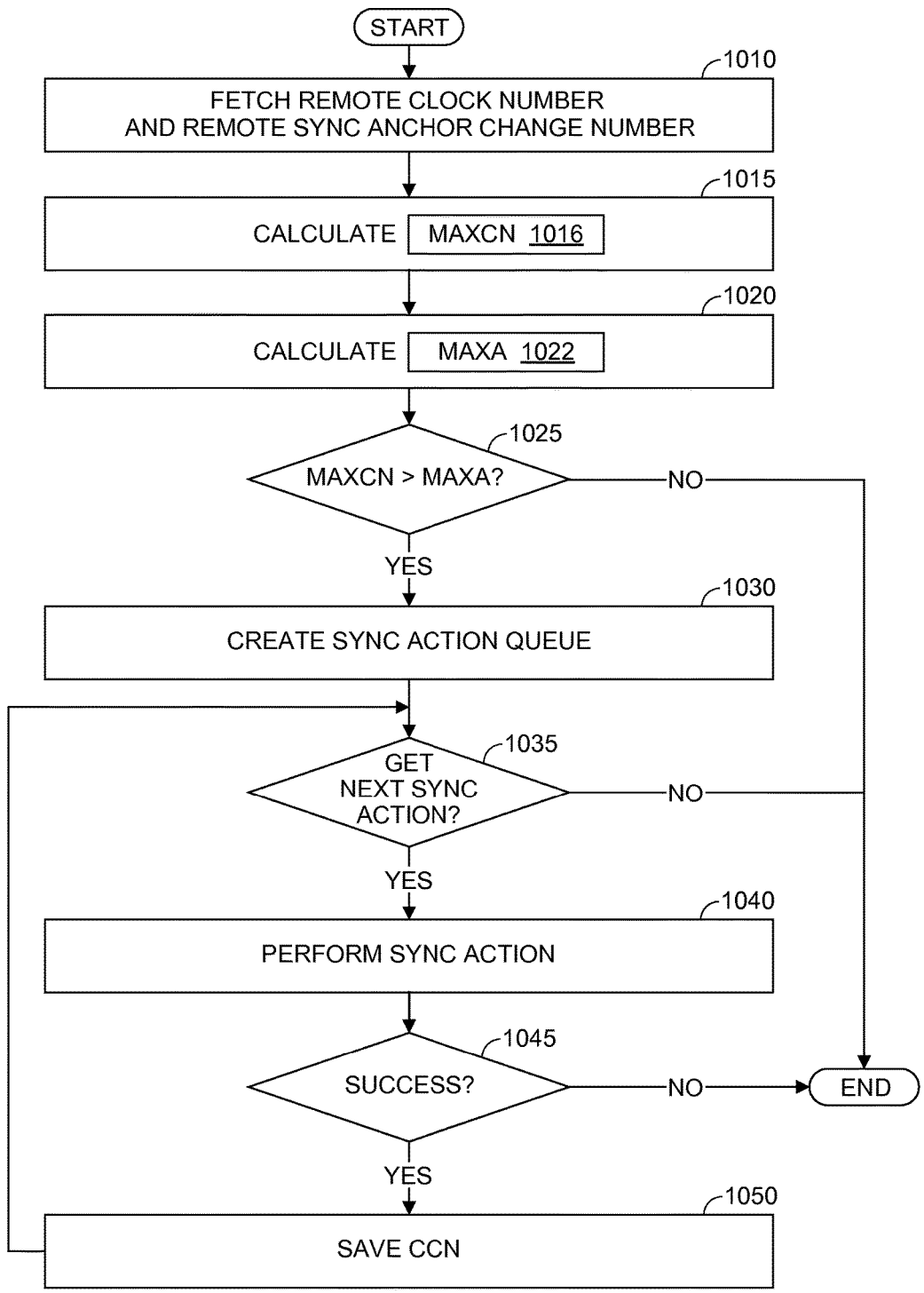
FIG. 10 is a flow chart illustrating one embodiment of a process for synchronizing two data stores.

FIG. 10 is a flow chart illustrating one embodiment of a process for synchronizing two data stores. The first state of the synchronization process begins at step 1010 when sync processor 520 of FIG. 5 of device L 410L requests that device R 410R returns a remote clock number (RCN 560R) of FIG. 5, and sync anchor change number 660 of FIG. 6 for local storage device identifier 550L of FIG. 5 stored in remote sync anchor table 590R of FIG. 5. If device R 410R of FIG. 4 has never synchronized remote data store 540R of FIG. 5 with local data store 540L of FIG. 5, the sync anchor change number 660 for local storage device identifier 550L will not be present in remote sync anchor table 590R and the returned value will be zero. In step 1015 the sync processor 520 calculates the maximum clock number (MAXCN 1016) as the greater of the LCN 560L and RCN 560R of FIG. 5. In step 1020 the sync processor 520 calculates the maximum anchor (MAXA 1022) as the greater of the sync anchor change numbers 660 read from sync anchor tables 590L and 590R of FIG. 5. If device L 410L of FIG. 4 has never synchronized local data store 540L with remote data store 540R, the sync anchor change number 660 for remote storage device identifier 550R of FIG. 5 will not be present in local sync anchor table 590L and the sync anchor change number 660 in local sync anchor table 590L will be zero. In step 1025 if MAXCN 1016 is greater than MAXA 1022 the data has changed in one or both data stores 540L and 540R since they were last synchronized. In step 1025, if MAXCN 1016 is less than or equal to MAXA 1022, the data stores are already synchronized and the synchronization process ends.

If data stores 540L and 540R need to be synchronized as determined in the first stage, the second stage of the synchronization process begins in step 1030 where the sync processor 520 creates a sync action queue (see FIG. 11) exemplified by sync action queue 900 of FIG. 9. The sync action queue 900 contains zero or more sync action entries 960 of FIG. 9 for synchronizing the local data store with the remote data store.

After creating the sync action queue 900 in the second stage of the synchronization process, the third stage of the process begins in step 1035 when the sync processor 520 gets the next sync action entry 960 from sync action queue 900. If there are no more sync action entries 960 in the sync action queue 900, the synchronization process ends. When the sync processor 520 gets the next sync action entry 960 from sync action queue 900 it performs the sync action 950 in step 1040 (see FIG. 18). If the result of the sync action 950 is successful in step 1045, the sync processor 520 saves CCN 940 as sync anchor change number 660 in local sync anchor table 590L for remote storage device identifier 550R in step 1050. If the sync action 950 is not successful the synchronization process ends. After step 1050 the sync processor 520 repeats step 1035. If the user interrupts the process of synchronization or there is a loss of connectivity between the two synchronizing devices, the sync processor 520 removes the remaining sync action entries 960 from sync action queue 900 and the synchronization process ends.

Process to Create a Sync Action Queue

Figure 11:
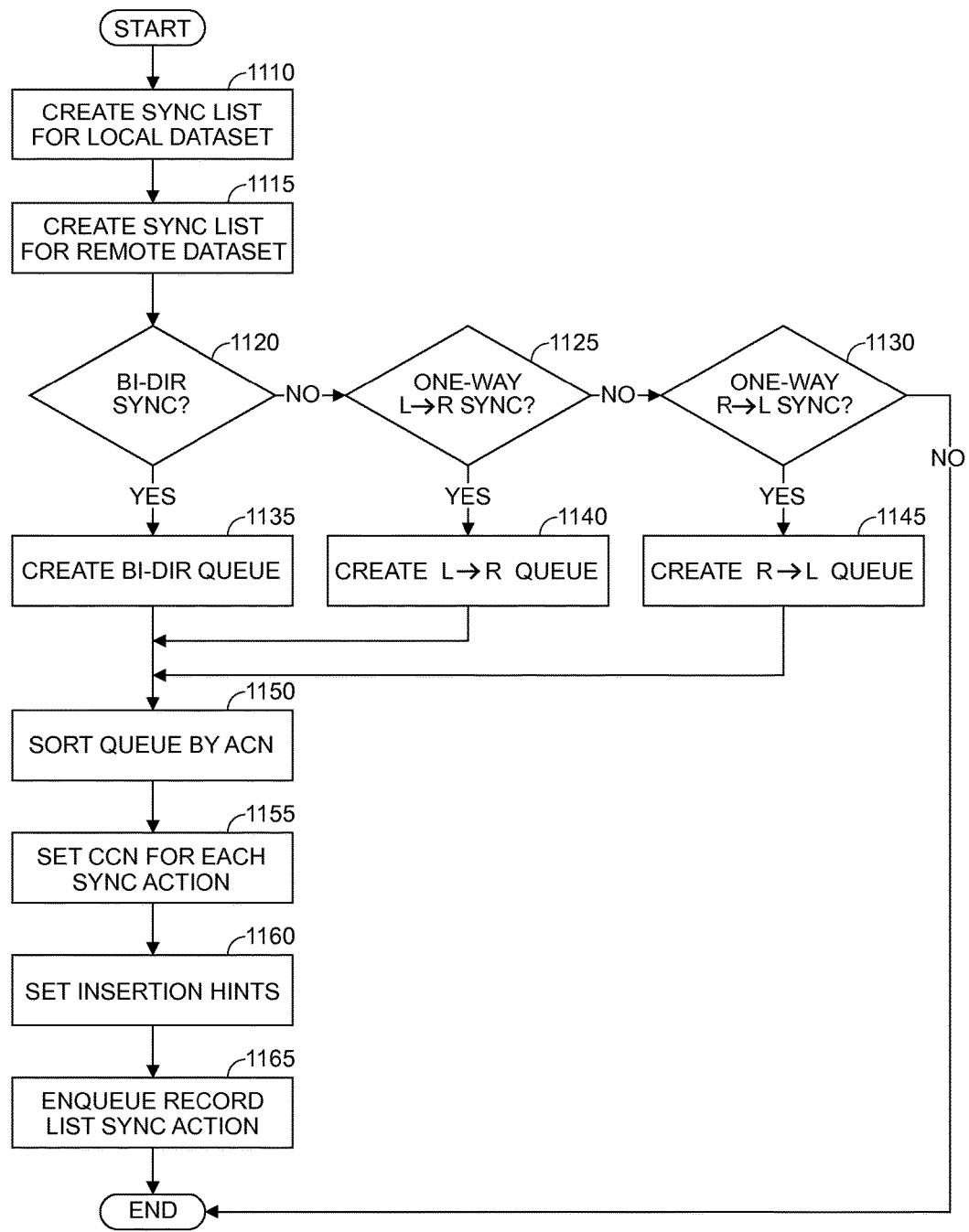
FIG. 11 is a flow chart illustrating one embodiment of the process for creating a sync action queue.

FIG. 11 is a flow chart illustrating one embodiment of the process for creating a sync action queue 900 of FIG. 9 in step 1030 of FIG. 10. In step 1110 sync processor 520 of FIG. 5 of device L 410L of FIG. 4 queries local data store 540L of FIG. 5 including local dataset 570L of FIG. 5 and optional local record list 580L of FIG. 5, and creates a synchronization list exemplified by local sync list 800L of FIG. 8a. In step 1115 the sync processor 520 of the local device requests that device R 410R of FIG. 4 queries remote data store 540R of FIG. 5 including remote dataset 570R and optional remote record list 580R of FIG. 5, and create and return a synchronization list exemplified by remote sync list 800R of FIG. 8b.

In step 1120, sync processor 520 of device L 410L determines whether the user has requested bi-directional synchronization so that changes in local data store 540L are applied to remote data store 540R and changes in remote data store 540R are applied to local data store 540L. If the user has not requested bi-directional synchronization, in step 1125 the sync processor 520 determines whether the user has requested one-way local-to-remote synchronization so that changes in local data store 540L are applied to remote data store 540R, but changes in remote data store 540R are not applied to local data store 540L. If the user has not requested one-way local-to-remote synchronization, in step 1130 the sync processor 520 determines whether the user has requested one-way remote-to-local synchronization so that changes in remote data store 540R are applied to local data store 540L, but changes in local data store 540L are not applied to remote data store 540R. If the user has not requested one-way remote-to-local synchronization, no sync action entries 960 of FIG. 9 are added to the sync action queue 900 and the synchronization process ends after step 1035 in FIG. 10.

Figure 12:
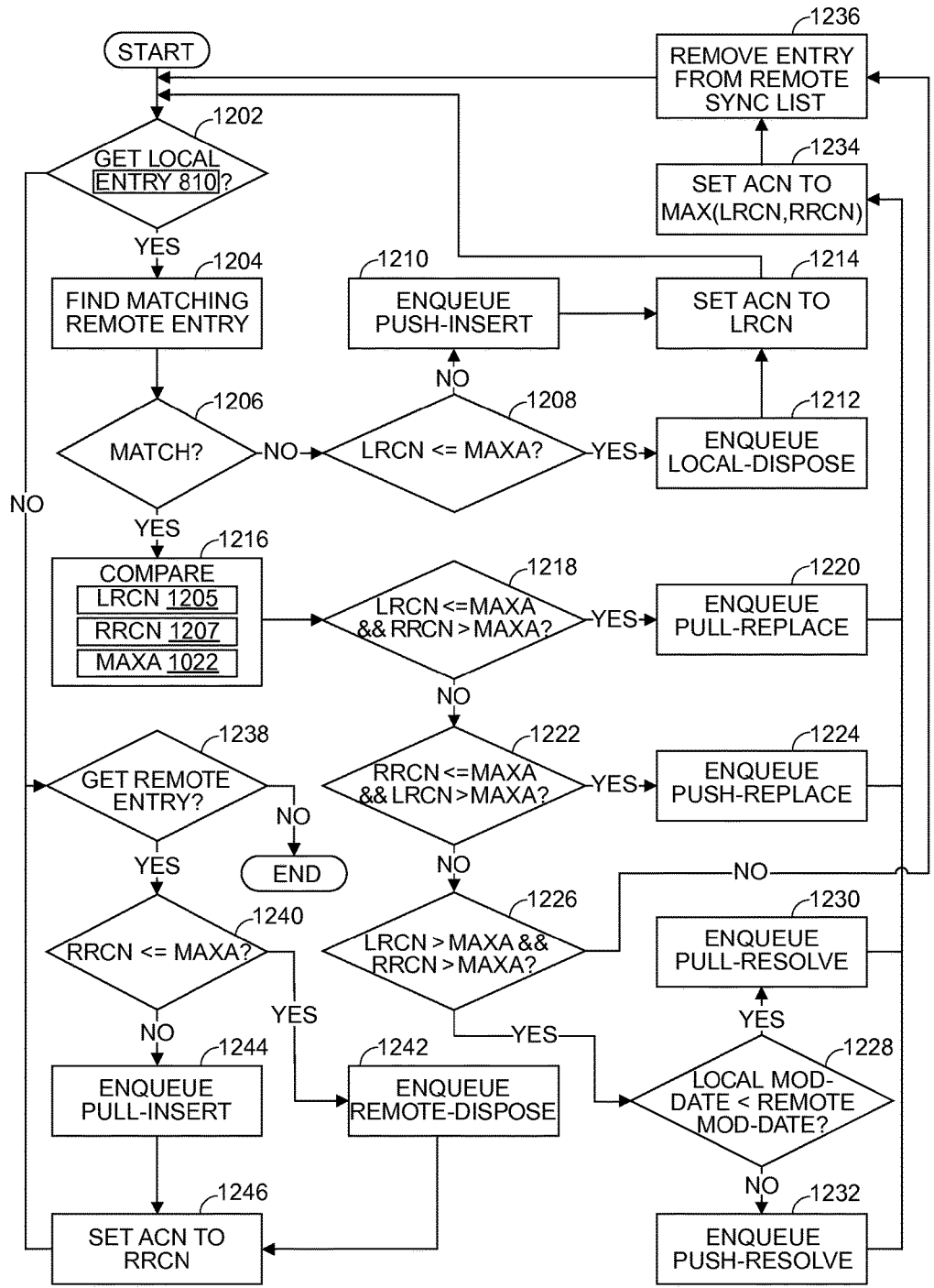
FIG. 12 is a flow chart illustrating one embodiment of the process for creating a bi-directional sync action queue.

If the user has requested bi-directional synchronization, in step 1135 the sync processor 520 creates a bi-directional sync action queue 900 (see FIG. 12). If the user has requested one-way local-to-remote synchronization, in step 1140 the sync processor 520 creates a one-way local-to-remote sync action queue 900 (see FIG. 13). If the user has requested one-way remote-to-local synchronization, in step 1145 the sync processor 520 creates a one-way remote-to-local sync action queue 900 (see FIG. 14). After creating the sync action queue 900, the sync processor 520 sorts the sync action queue 900 by ascending order of ACN 920 of FIG. 9 in step 1150, and sets CCN 940 of FIG. 9 for each sync action entry 960 in step 1155 (see FIG. 15). In step 1160 the sync processor 520 may set an optional insertion hint 930 of FIG. 9 for each new data record 602 of FIG. 6 inserted in dataset 570L or 570R of FIG. 5 if they are presented in sorted order (see FIG. 16). In step 1165 the sync action entry 960 for the optional record list 580 of FIG. 5 is appended to the sync action queue 900 (see FIG. 17).

Process to Create a Bi-Directional Sync Action Queue

FIG. 12 is a flow chart illustrating one embodiment of the process for creating a bi-directional sync action queue 900 of FIG. 9 in step 1135 of FIG. 11. The change numbers 615 of FIG. 8 for each entry 810 with matching UUID 610 of FIG. 8 in local and remote sync lists 800L of FIGS. 8a and 800R of FIG. 8b, respectively, are compared with the MAXA 1022. Depending on the result of the comparison, a sync action entry 960 of FIG. 9 may be appended to the sync action queue 900 to insert, copy, or delete a data record 602 of FIG. 6a in either the local dataset 570L of FIG. 6a or remote dataset 570R of FIG. 5.

In step 1202 sync processor 520 of FIG. 5 of device L 410L of FIG. 4 gets the next entry 810 from local sync list 800L and finds the entry 810 with matching UUID 610 in the remote sync list 800R in step 1204. If a matching entry 810 is found in step 1206, local record change number (LRCN 1205) and remote record change number (RRCN 1207) are compared with the MAXA 1022 in step 1216. The LRCN 1205 is the change number 615 of the data record 602 of the matching entry 810 in the local sync list 800L while the RRCN 1207 is the change number 615 of the data record 602 of the matching entry 810 in the remote sync list 800R.

If LRCN 1205 is less than or equal to MAXA 1022 and RRCN 1207 is greater than MAXA 1022 in step 1218, a sync action entry 960 having a PULL-REPLACE sync action 950 is appended to the sync action queue 900 in step 1220 because the data record 602 in remote dataset 570R has changed since the last synchronization, but the data record 602 in local dataset 570L has not. Example data record 602 C satisfies this condition when change number 615 '3' in the local dataset 570L in FIG. 7a and change number 615 '8' in the remote dataset 570R in FIG. 7c are compared to the MAXA 1022 which is '7' after the previous synchronization of local dataset 570L of FIG. 6a and local record list 580L of FIG. 6b.

If RRCN 1207 is less than or equal to MAXA 1022 and LRCN 1205 is greater than MAXA 1022 in step 1222 a sync action entry 960 having a PUSH-REPLACE sync action 950 is appended to the sync action queue 900 in step 1224 because the data record 602 in local dataset 570L has changed since the last synchronization, but the data record 602 in remote dataset 570R has not. Example data record 602 B satisfies this condition in FIGS. 7a and 7c.

If LRCN 1205 and RRCN 1207 are both greater than MAXA 1022 in step 1226, the data record 602 has changed in both datasets 570L and 570R since last synchronization. Example data record 602 D satisfies this condition in FIGS. 7a and 7c. If the last-modified date of the data record 602 of a local dataset 570L is less than the last-modified date of the data record 602 of a remote dataset 570R in step 1228, the data record 602 of the remote dataset 570R is newer and a sync action entry 960 having a PULL-RESOLVE sync action 950 is appended to the sync action queue 900 in step 1230 so that the data record 602 of the remote dataset 570R will be copied to the local dataset 570L where the conflict will be resolved in a manner not pertinent to this embodiment of the synchronization process. If the last-modified date of the data record 602 of a local dataset 570L is not less than the last-modified date of the data record 602 of a remote dataset 570R in step 1228, the data record 602 of the local dataset 570L is newer and a sync action entry 960 having a PUSH-RESOLVE sync action 950 is appended to the sync action queue 900 in step 1232 so that the data record 602 of the local dataset 570L will be copied to the remote dataset 570R where the conflict will be resolved in a manner not pertinent to this embodiment of the synchronization process.

After steps 1220, 1224, 1230, and 1232, ACN 920 of FIG. 9 in the sync action entry 960 is set to the greater of the LRCN 1205 and the RRCN 1207 in step 1234. ACN 920 will be used to set the CCN 940 of FIG. 9 in step 1155 of FIG. 11.

After step 1234 the entry 810 matched in step 1206 is removed from remote sync list 800R in step 1236. The entry 810 is also removed after step 1226 if LRCN 1205 and RRCN 1207 are both less than or equal to MAXA 1022 because neither the data record 602 of the remote dataset 570R nor its matching data record 602 of the local dataset 570L have changed since the last synchronization. It is necessary to remove the entry 810 from the remote sync list 800R so that any entries 810 in the remote sync list 800R will be examined after all of the entries 810 in the local sync list 800L have been returned in step 1202. After step 1236, step 1202 is repeated.

If a matching entry 810 is not found in the remote sync list 800R in step 1206 and LRCN 1205 is less than or equal to MAXA 1022 in step 1208 the data record 602 has been removed from remote dataset 570R since the last synchronization and a sync action entry 960 having a LOCAL-DISPOSE sync action 950 is appended to the sync action queue 900 in step 1212 to remove the data record 602 from local dataset 570L. Example data record 602 F satisfies this condition in FIG. 7a. If LRCN 1205 is greater than MAXA 1022 the data record 602 has been added to local dataset 570L since the last synchronization and a sync action entry 960 having a PUSH-INSERT sync action 950 is appended to the sync action queue 900 in step 1210 so that the data record 602 of the local dataset 570L will be copied to the remote dataset 570R. Example data record 602 G satisfies this condition in FIG. 7a. After steps 1210 and 1212, ACN 920 in the sync action entry 960 is set to the LRCN 1205 in step 1214. After step 1214, step 1202 is repeated.

After all of the entries 810 in the local sync list 800L have been returned in step 1202, the sync processor 520 gets the next entry 810 from the remote sync list 800R in step 1238. If RRCN 1207 is less than or equal to MAXA 1022 in step 1240 the data record 602 has been removed from local dataset 570L since the last synchronization and a sync action entry 960 having a REMOTE-DISPOSE sync action 950 is appended to the sync action queue 900 in step 1242 to remove the data record 602 from the remote dataset 570R. Example data record 602 E satisfies this condition in FIG. 7c. If RRCN 1207 is greater than MAXA 1022 the data record 602 has been added to remote dataset 570R since the last synchronization and a sync action entry 960 having a PULL-INSERT sync action 950 is appended to the sync action queue 900 in step 1244 so that the data record 602 of the remote dataset 570R will be copied to the local dataset 570L. After steps 1242 and 1244, ACN 920 in the sync action entry 960 is set to the RRCN 1207 in step 1246. After step 1246, step 1238 is repeated.

After all of the entries 810 in the remote sync list 800R have been returned in step 1238, the process to create a bi-directional sync action queue 900 ends.

Process to Create a One-Way Local-to-Remote Sync Action Queue

Figure 13:
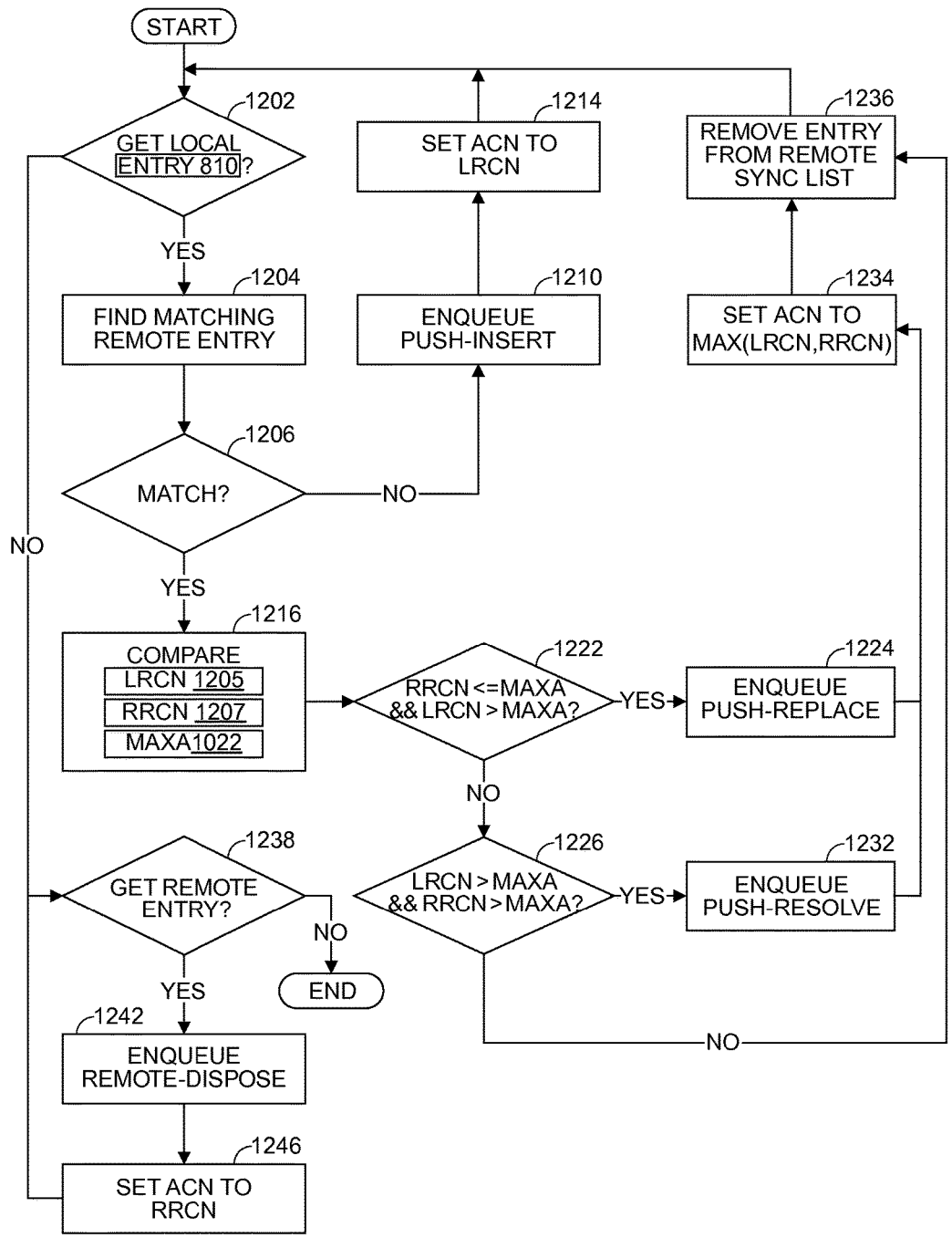
FIG. 13 is a flow chart illustrating one embodiment of the process for creating a one-way local-to-remote sync action queue.

FIG. 13 is a flow chart illustrating one embodiment of the process for creating a one-way local-to-remote sync action queue 900 of FIG. 9 in step 1140 of FIG. 11. The change numbers 615 of FIG. 6 for each data record 602 of FIG. 6 with matching UUID 610 of FIG. 6 in the local and remote sync lists 800 of FIG. 8 are compared with the MAXA 1022. Depending on the result of the comparison, a sync action entry 960 of FIG. 9 may be appended to the sync action queue 900 to insert, copy, or delete a data record 602 in remote dataset 570R of FIG. 5 to synchronize it with local dataset 570L of FIG. 5. The contents of local dataset 570L are not altered. Since the process for creating a one-way local-to-remote sync action queue 900 is very similar to the process for creating a bi-directional sync action queue 900, the same steps for modifying remote dataset 570R are used in FIG. 13.

Process to Create a One-Way Remote-to-Local Sync Action Queue

Figure 14:
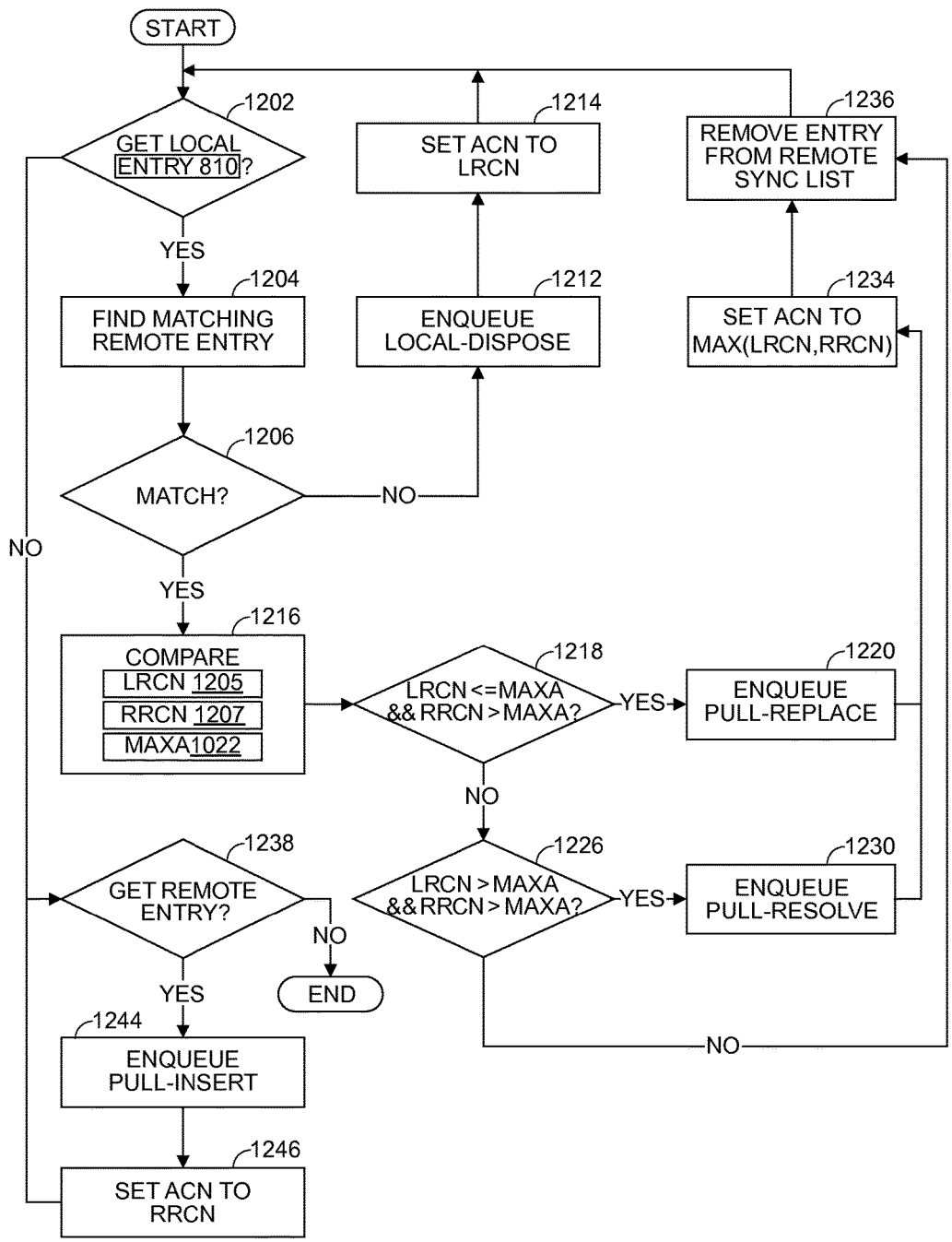
FIG. 14 is a flow chart illustrating one embodiment of the process for creating a one-way remote-to-local sync action queue.

FIG. 14 is a flow chart illustrating one embodiment of the process for creating a one-way remote-to-local sync action queue 900 of FIG. 9 in step 1145 of FIG. 11. The change numbers 615 of FIG. 6 for each data record 602 of FIG. 6 with matching UUID 610 of FIG. 6 in the local and remote sync lists 800 of FIG. 8 are compared with the MAXA 1022. Depending on the result of the comparison, a sync action entry 960 of FIG. 9 may be appended to the sync action queue 900 to insert, copy, or delete a data record 602 in local dataset 570L of FIG. 6a to synchronize it with remote dataset 570R of FIG. 5. The contents of remote dataset 570R are not altered. Since the process for creating a one-way remote-to-local sync action queue 900 is very similar to the process for creating a bi-directional sync action queue 900, the same steps for modifying local dataset 570L are used in FIG. 14.

Process to Set the Composite Change Clock For Each Sync Action

Figure 15:
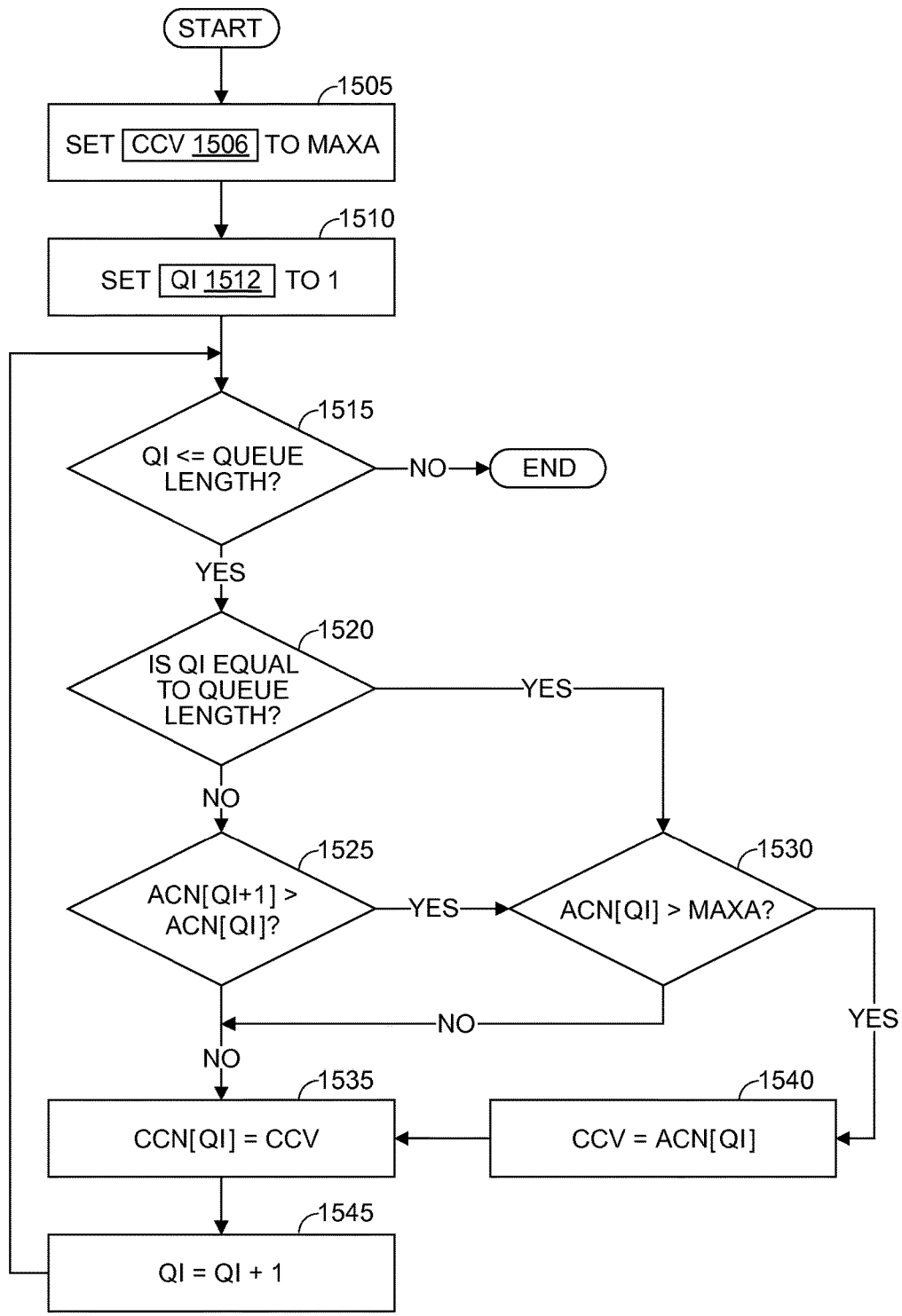
FIG. 15 is a flow chart illustrating one embodiment of the process for setting a composite clock number for each sync action entry in a sync action queue.

FIG. 15 is a flow chart illustrating one embodiment of the process for setting CCN 940 of FIG. 9 for each sync action entry 960 of FIG. 9. After each sync action 950 is performed, sync processor 520 of FIG. 5 of device L 410L of FIG. 4 updates sync anchor change number 660 of FIG. 6c in local sync anchor table 590L of FIG. 5 with the CCN 940 in step 1050 of FIG. 10.

In step 1505 the sync processor 520 sets a change clock variable (CCV 1506) to the MAXA 1022 of FIG. 10 from the previous synchronization of local data store 540L of FIG. 5 with remote data store 540R of FIG. 5. In step 1510 a queue index (QI 1512) is set to the first position of the sync action queue 900 of FIG. 9. While the QI 1512 is less than or equal to the length of the sync action queue 900 in step 1515, set CCN 940 for each sync action entry 960. If the QI 1512 is equal to the length of the sync action queue 900 in step 1520 or the next ACN 920 of FIG. 9 in the sync action queue 900 is greater than the current ACN 920 in step 1525, and if the current ACN 920 is greater than the MAXA 1022 in step 1530, set the CCV 1506 to the current ACN 920 in step 1540. If more than one sync action entry 960 has the same ACN 920, wait until the last sync action 960 with the same ACN 920 before setting the CCN 940 to the ACN 920 stored in the CCV 1506 in step 1535. This ensures that the CCN 940 only updates the sync anchor change number 660 in local sync anchor table 590L in step 1050 of FIG. 10 when all of the data records 602 of FIG. 6a with the same change number 615 of FIG. 6a have been synchronized, so that no data records 602 will be skipped during the next synchronization if the current synchronization process is interrupted. The sync action entries 960 for exemplary data records 602 B and C in FIG. 9 illustrate step 1525. Both data records 602 have a ACN 920 of '8' but the CCN 940 only changes to '8' when data record 602 C is synchronized.

In step 1545 the sync processor 520 increments the QI 1512 so that it can examine the next sync action entry 960 in the sync action queue 900.

Process to Set Insertion Hints for New Records

Figure 16:
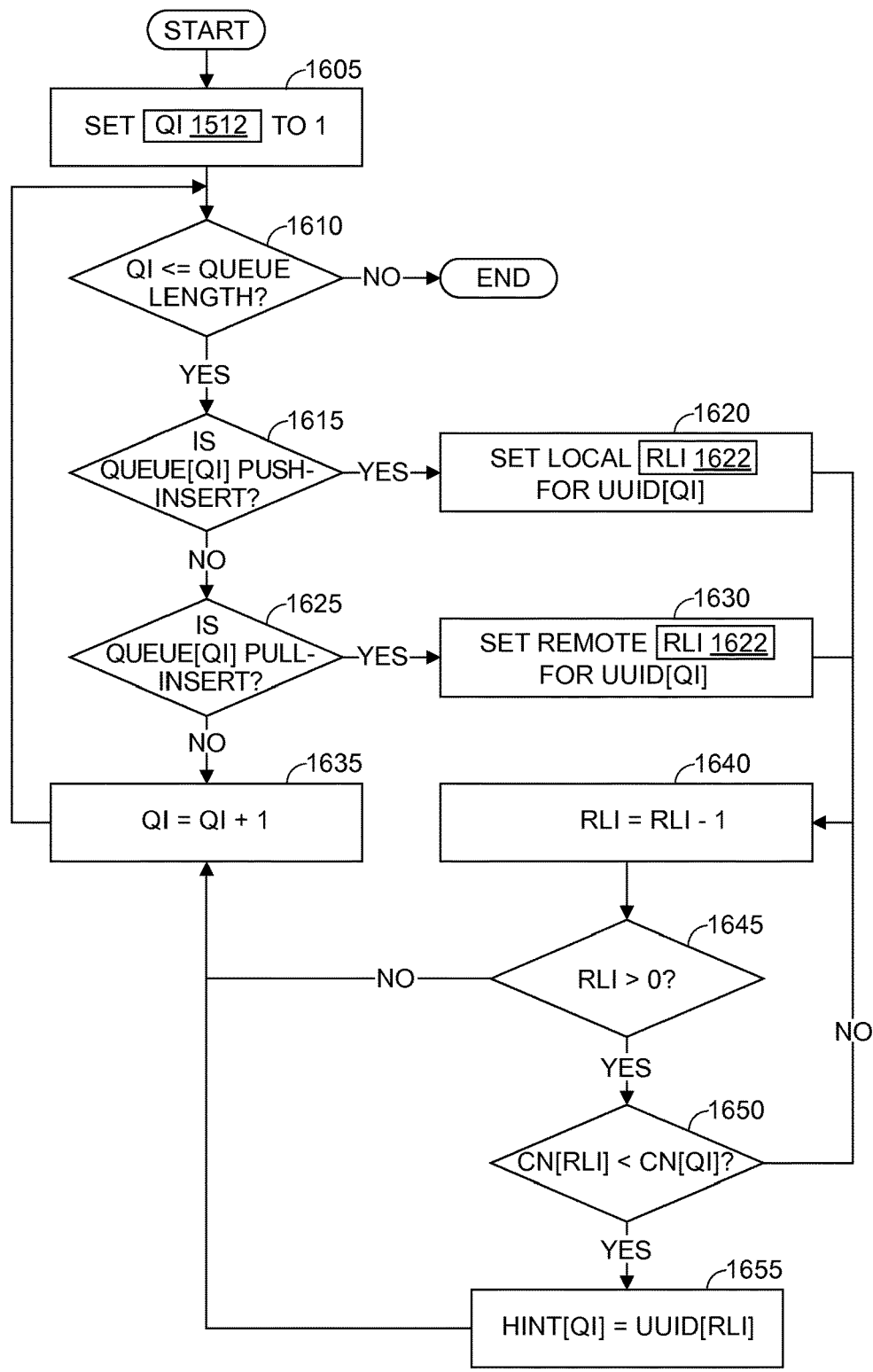
FIG. 16 is a flow chart illustrating one embodiment of the optional process for setting an insert hint for each sync action entry in a sync action queue.

FIG. 16 is a flow chart illustrating one embodiment of the optional process for setting an insertion hint 930 of FIG. 9 for each sync action entry 960 of FIG. 9 having a PULL-INSERT and PUSH-INSERT sync action 950 of FIG. 9 in a sync action queue 900 of FIG. 9 so that the sync processor 520 of FIG. 5 knows where to insert a data record 602 of FIG. 6 in a data store 540 of FIG. 5 that may be presented in sorted order. If the optional record list 580 of FIG. 5 is present in the data store 540, an insertion hint 930 may be used to insert a data record 602 at a particular position in the list.

Sync processor 520 of device L 410L of FIG. 4 starts the iteration through each sync action entry 960 in the sync action queue 900 by setting the QI 1512 of FIG. 15 to the first position of the sync action queue 900 in step 1605. If the QI 1512 is less than or equal the length of the sync action queue 900 in step 1610 test the sync action 950 at the QI 1512 position. If the sync action 950 is a PUSH-INSERT in step 1615, set the record list index (RLI 1622) in step 1620 to the position of the data record 602 in local record list 580L of FIG. 5 that matches the UUID 610 in the sync action entry 960. Iterate backwards through the local record list at step 1640 until the beginning of the list in step 1645, looking for a data record 602 with a change number 615 less than the change number 615 of the data record 602 in the sync action entry 960. Only data records 602 with smaller change numbers 615 are considered because they are already in the record list 580 even if they were inserted during the current synchronization process. If a data record 602 is found at step 1650, set the insertion hint 930 in the sync action entry 960 to the UUID 610 of the data record 602 at 1655 and increment the QI 1512 at 1635 to examine the next sync action entry 960 in the sync action queue 900.

If the sync action 950 is a PULL-INSERT in step 1625 set the RLI 1622 in step 1630 to the position of the data record 602 in remote record list 580R of FIG. 5. Perform the same steps as for a PUSH-INSERT but iterate backwards through the remote record list instead.

Process to Append a Record List Sync Action

Figure 17:
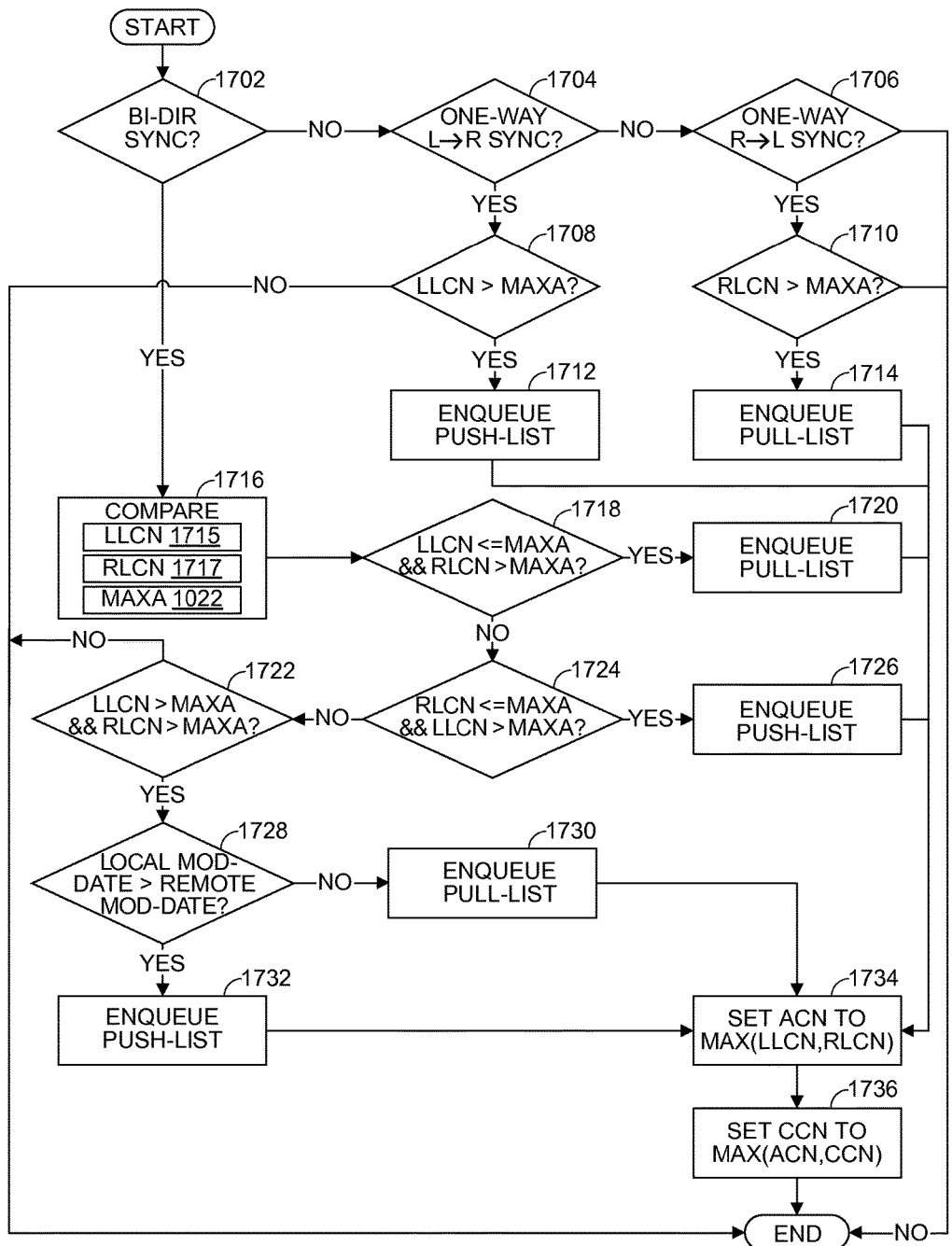
FIG. 17 is a flow chart illustrating one embodiment of the optional process for appending a record list sync action entry to a sync action queue.

FIG. 17 is a flow chart illustrating one embodiment of the optional process for appending a sync action entry 960 of FIG. 9 for a record list 580 of FIG. 5 to a sync action queue 900 of FIG. 9 in step 1165 of FIG. 11. The sync action entry 960 for the record list 580 is optional; it may be used when the dataset 570 of FIG. 5 is presented in sorted order.

In step 1702, sync processor 520 of FIG. 5 of device L 410L of FIG. 4 determines whether the user has requested bi-directional synchronization. If the user has not requested bi-directional synchronization, in step 1704 the sync processor 520 determines whether the user has requested one-way local-to-remote synchronization. If the user has not requested one-way local-to-remote synchronization, in step 1706 the sync processor 520 determines whether the user has requested one-way remote-to-local synchronization. If the user has not requested one-way remote-to-local synchronization, no sync action entry 960 for the record list 580 is appended to the sync action queue 900.

A local record list change number (LLCN 1715) and a remote record list change number (RLCN 1717) are compared with the MAXA 1022 in step 1716. The LLCN 1715 is the record list change number 630 of local record list 580L, while the RLCN 1717 is the record list change number 630 of FIG. 6 of remote record list 580R of FIG. 5. If LLCN 1715 is less than or equal to MAXA 1022 of FIG. 10 and RLCN 1717 is greater than MAXA 1022 in step 1718, a PULL-LIST sync action 950 is appended to the sync action queue 900 in step 1720 because the remote record list 580R has changed since the last synchronization but the local record list 580L has not. If RLCN 1717 is less than or equal to MAXA 1022 and LLCN 1715 is greater than MAXA 1022 in step 1724, a PUSH-LIST sync action 950 is appended to the sync action queue 900 in step 1726 because the local record list 580L of FIG. 5 has changed since the last synchronization but the remote record list 580R has not.

If LLCN 1715 and RLCN 1717 are both greater than MAXA 1022 in step 1722, both the local and remote record lists 580R have changed since last synchronization. If the last-modified date of the local record list 580L is greater than the last-modified record date 635 of FIG. 6b of the remote record list 580R in step 1728, the local record list 580L is newer and a PUSH-LIST sync action 950 is appended to the sync action queue 900 in step 1732 to copy the local record list 580L to remote data store 540R. If the last-modified record date 635 of the local record list 580L is less than or equal to the last-modified record date 635 of the remote record list 580R in step 1728, the remote record list 580R is newer and a PULL-LIST sync action 950 is appended to the sync action queue 900 in step 1730 to copy the remote record list 580R to local data store 540L.

In the case of one-way local-to-remote synchronization, if the LLCN 1715 is greater than the MAXA 1022 in step 1708, the local record list 580L has changed since the last synchronization and a PUSH-LIST sync action 950 is appended to the sync action queue 900 in step 1712.

In the case of one-way remote-to-local synchronization, if the RLCN 1717 is greater than the MAXA 1022 in step 1710, the remote record list 580R has changed since the last synchronization and a PULL-LIST sync action 950 is appended to the sync action queue 900 in step 1714.

After a PUSH-LIST or PULL-LIST sync action 950 is appended to the sync action queue 900, ACN 920 of FIG. 9 is set to the greater of the LLCN 1715 and RLCN 1717 in step 1734. In step 1736 CCN 940 of FIG. 9 for the sync action 950 is set to the greater of the ACN 920 and largest value of CCN 940 already in the sync action queue 900.

Process to Perform a Sync Action

Figure 18:
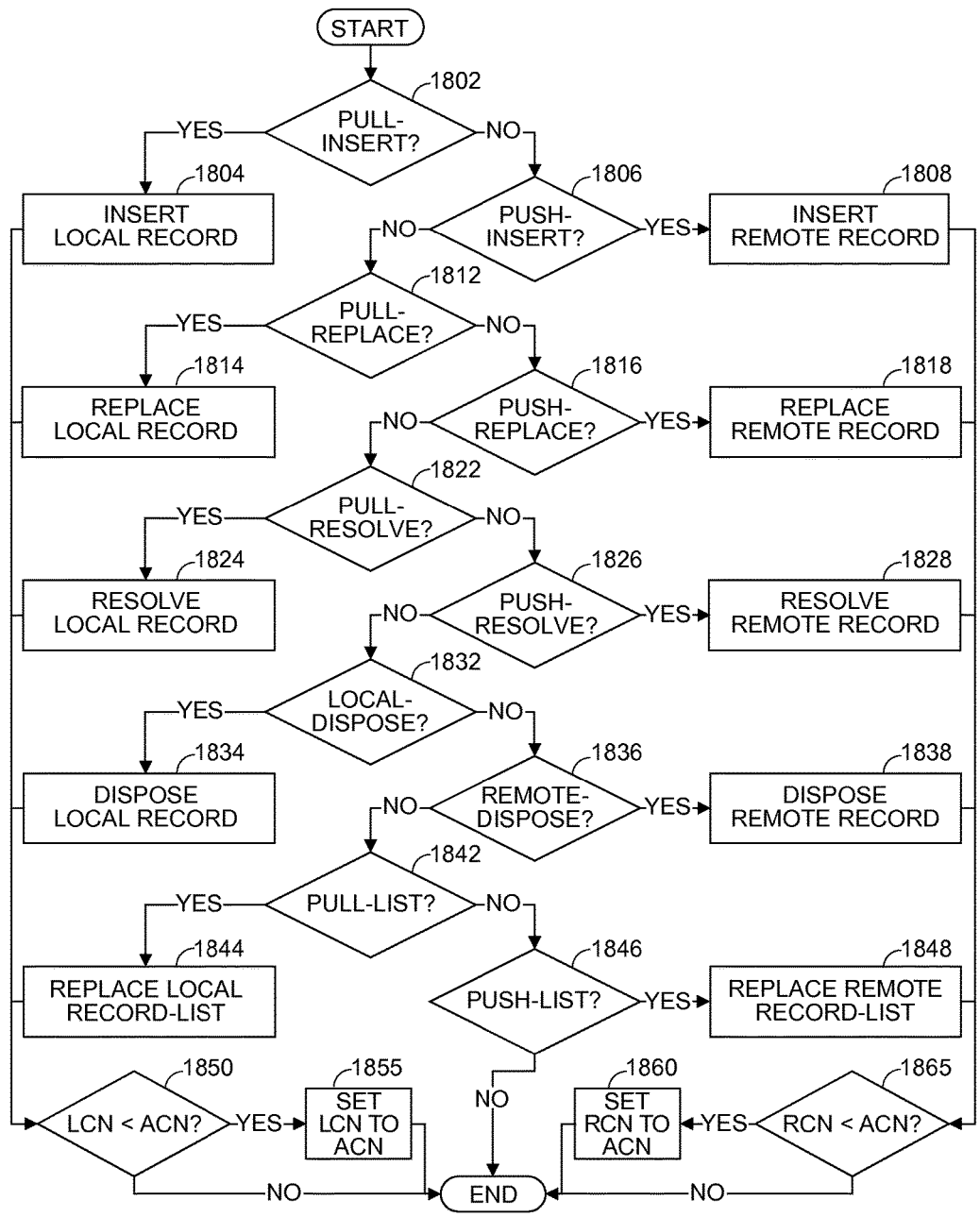
FIG. 18 is a flow chart illustrating one embodiment of the process for performing a sync action.

FIG. 18 is a flow chart illustrating one embodiment of the process for performing a sync action 950 of FIG. 9. Sync processor 520 of FIG. 5 in device L 410L of FIG. 4 initiates each sync action 950, but may delegate part or all of the sync action 950 to the sync processor 520 in device R 410R of FIG. 4.

If the sync action 950 is PULL-INSERT in step 1802, the data record 602 of FIG. 6 with UUID 610 of FIG. 6 is copied from remote dataset 570R of FIG. 5 and inserted in local dataset 570L of FIG. 5 in step 1804. Insertion hint 930 of FIG. 9 may specify the location of the data record 602 in local record list 580L of FIG. 5. If the sync action 950 is PUSH-INSERT in step 1806, the data record 602 with UUID 610 is copied from local dataset 570L and inserted in remote dataset 570R in step 1808. Insertion hint 930 may specify the location of the data record 602 in the remote record list 580R of FIG. 5.

If the sync action 950 is PULL-REPLACE in step 1812, the data record 602 with UUID 610 is copied from the remote dataset 570R and replaces the data record 602 in the local dataset 570L in step 1814. If the sync action 950 is PUSH-REPLACE in step 1816, the record with UUID 610 is copied from the local dataset 570L and replaces the data record 602 in the remote dataset 570R in step 1818.

If the sync action 950 is PULL-RESOLVE in step 1822, the data record 602 with UUID 610 is copied from the remote dataset 570R and replaces the data record 602 in the local dataset 570L after conflict resolution in step 1824. If the sync action 950 is PUSH-RESOLVE in step 1826, the data record 602 with UUID 610 is copied from the local dataset 570L and replaces the data record 602 in the remote dataset 570R after conflict resolution in step 1828.

If the sync action 950 is LOCAL-DISPOSE in step 1832, the data record 602 with UUID 610 is disposed from the local dataset 570L in step 1834. If the sync action 950 is REMOTE-DISPOSE in step 1836, the data record 602 with UUID 610 is disposed from the remote dataset 570R in step 1838.

If the sync action 950 is PULL-LIST in step 1842, remote record list 580R is copied from remote data store 540R of FIG. 5 and replaces local record list 580L in local data store 540L of FIG. 5 in step 1844. If the sync action 950 is PUSH-LIST in step 1846, local record list 580L is copied from local data store 540L and replaces remote record list 580R in remote data store 540R in step 1848.

After the sync action 950 is performed, the sync processor 520 in local device 540L sets LCN 560L of FIG. 5 to the ACN 920 of FIG. 9 in step 1855 if it is less than ACN 920 in step 1850. Similarly the sync processor 520 in remote device 540R sets RCN 560R of FIG. 5 to the ACN 920 in step 1860 if it is less than ACN 920 in step 1865.

Computer System Embodiment

Embodiments of the present invention may be employed to facilitate the synchronization of data in any of a wide variety of computing contexts. For example, implementations are contemplated in which users may interact with a diverse network environment via any type of computer system ranging from an integrated circuit, a printed circuit board, or a small handheld computing device up to a huge super computer.

Figure 19:
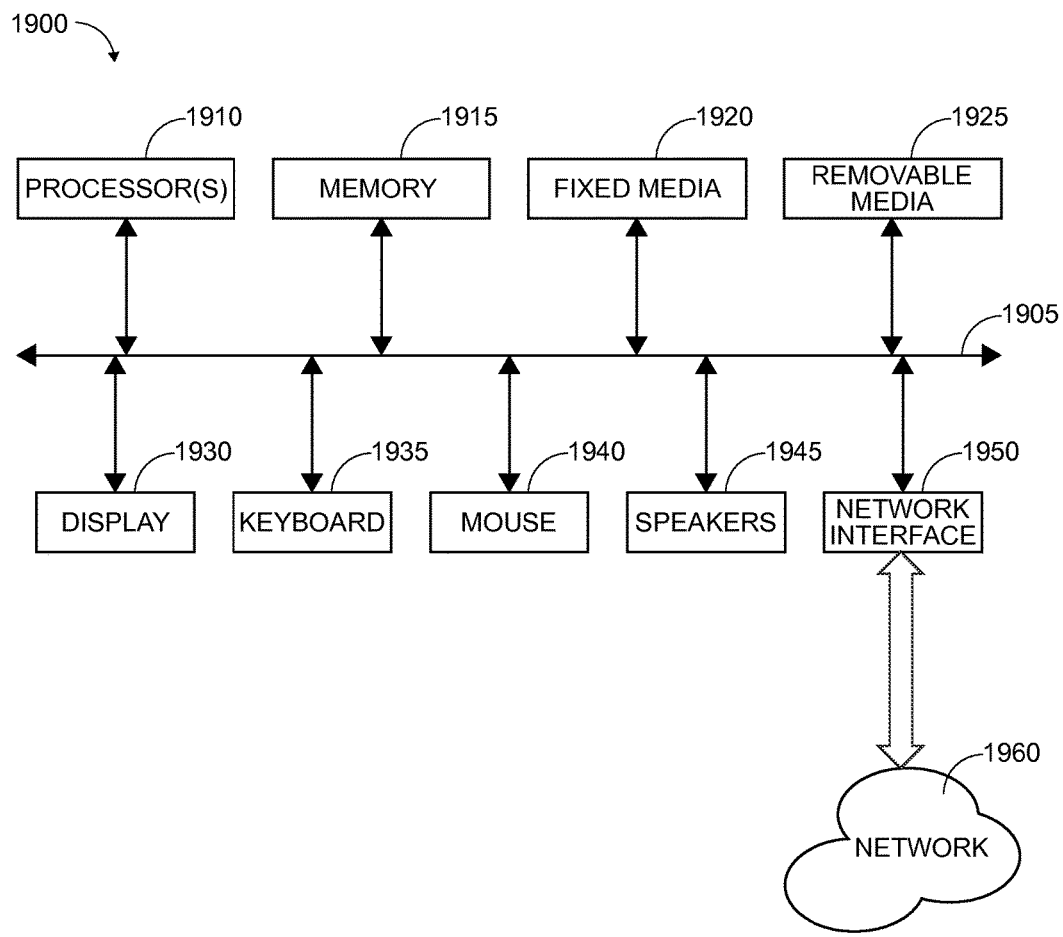
FIG. 19 is an example of a block diagram for a computer system suitable for implementing embodiments of the present invention.

FIG. 19 is an example of a block diagram for a computer system 1900 suitable for implementing embodiments of the present invention. Attached to system bus 1905 are a wide variety of subsystems. Processor(s) 1910 (also referred to as central processing units, or CPUs) are coupled to one or more storage devices including memory 1915, fixed media 1920, and removable media 1925. Memory 1915 includes random access memory (RAM), read-only memory (ROM), and non-volatile flash memory. Fixed media 1920 includes hard disks. Removable media 1925 includes CD-ROMS, DVDs, and flash memory cards. CPU 1910 is also coupled to a variety of input/output devices such as display 1930, keyboard 1935, mouse 1940 and speakers 1945. The data stores 540 can include the memory 1915, the fixed media 1920, and the removable media 1925. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers.

The computer system in FIG. 19 may be coupled to another computer or telecommunications network 1960 using network interface 1950. With such a network interface, it is contemplated that the CPU might receive information from the network 1960, or might output information to the network in the course of performing the above-described process steps. Furthermore, process embodiments of the present invention may execute solely upon CPU 1910 or may execute over a network in conjunction with a remote CPU that shares a portion of the processing.

The network 1960 may comprise a conventional wireless data communication system, for example, general packet radio service (GPRS), IEEE 802.11 (or WiFi), IEEE 802.16 (or WiMax), Bluetooth, or any other suitable wireless communication system. Alternatively, network 1960 may comprise a conventional wired data communication system, such as Ethernet, digital subscriber line (DSL), integrated services digital network (ISDN), or any other suitable wired communication system.

In addition, embodiments of the present invention further relate to computer storage products with a non-transitory computer-readable storage medium that can store data and computer code for performing various computer-implemented operations. Examples of computer-readable media include, but are not limited to: magnetic media such as hard disks; optical media such as CD-ROMs, DVDs, and holographic devices; non-volatile computer memory such as flash memory; and hardware devices that are specially configured to store and execute program code, such as application-specific integrated circuits (ASICs), programmable logic devices (PLDs) and ROM and RAM devices.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products encoded on a non-transitory computer-readable storage medium for execution by, or to control the operation of data processing apparatus.

Although the description above contains many specificities for purposes of clarity of understanding, these should not be construed as limiting the scope of the embodiments. The described embodiments should be taken as illustrative and not restrictive.

Thus, it has been discovered that the system for synchronization furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the system for synchronization has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A synchronization method comprising:
calculating a maximum anchor as the greater of sync anchor change numbers; and
creating a sync action entry for a data record on a local machine, a data record on a remote machine, or a combination thereof, the sync action entry having an action change number and a composite clock number:
the action change number set:
to a greatest change number between a change number for the data record on the local machine and a change number for the data record on the remote machine,
the change number for the data record on the local machine generated based on the data record on the local machine being added or modified and generated autonomously from any changes in data in the remote machine, and
the change number for the data record on the remote machine generated based on the data record on the remote machine being added or modified and generated autonomously from any changes in data in the local machine; and
the composite clock number set:

to the maximum anchor based on the action change number of the sync action entry being less than the maximum anchor, and to the action change number of the sync action entry based on the action change number of the sync action entry being less than an action change number of a subsequent sync action entry and the action change number of the sync action entry being greater than the maximum anchor.

2. The method of claim 1, further comprising updating one of the sync anchor change numbers with the composite clock number.

3. The method of claim 1, further comprising sorting the sync action entry by the action change number.

4. The method of claim 1, further comprising creating a bi-directional sync action queue or a one-way sync action queue.

5. The method of claim 1, further comprising:
calculating a maximum clock number;
comparing the maximum clock number to the maximum anchor; and
ending a synchronization if the maximum clock number is less than or equal to the maximum anchor.

6. The method of claim 1, wherein creating the sync action entry includes creating the sync action entry having a sync action determined, at least in part, by a comparison between the maximum anchor and a local record change number, a remote record change number, or a combination thereof.

7. A non-transitory computer readable medium, useful in association with a processor, including instructions configured to:
calculate a maximum anchor as the greater of sync anchor change numbers; and
create a sync action entry for a data record on a local machine, a data record on a remote machine, or a combination thereof, the sync action entry having an action change number and a composite clock number:
the action change number set:
to a greatest change number between a change number for the data record on the local machine and a change number for the data record on the remote machine,
the change number for the data record on the local machine generated based on the data record on the local machine being added or modified and generated autonomously from any changes in data in the remote machine, and
the change number for the data record on the remote machine generated based on the data record on the remote machine being added or modified and generated autonomously from any changes in data in the local machine; and
the composite clock number set:
to the maximum anchor based on the action change number of the sync action entry being less than the maximum anchor, and
to the action change number of the sync action entry based on the action change number of the sync action entry being less than an action change number of a subsequent sync action entry and the action change number of the sync action entry being greater than the maximum anchor.

8. The non-transitory computer readable medium of claim 7, further comprising instructions configured to update one of the sync anchor change numbers with the composite clock number.

9. The non-transitory computer readable medium of claim 7, further comprising instructions configured to sort the sync action entry by the action change number.

10. The non-transitory computer readable medium of claim 7, further comprising instructions configured to create a bi-directional sync action queue or a one-way sync action queue.

11. The non-transitory computer readable medium of claim 7, further comprising instructions configured to:
calculate a maximum clock number;
compare the maximum clock number to the maximum anchor; and
end a synchronization if the maximum clock number is less than or equal to the maximum anchor.

12. The non-transitory computer readable medium of claim 7, wherein the instructions configured create the sync action entry includes instructions configured to create the sync action entry having a sync action determined, at least in part, by a comparison between the maximum anchor and a local record change number, a remote record change number, or a combination thereof.

13. A synchronization system comprising:
a sync processor configured to calculate a maximum anchor as the greater of sync anchor change numbers; and
a data store, coupled to the processor, including a sync action entry for a data record on a local machine, a data record on a remote machine, or a combination thereof, the sync action entry having an action change number and a composite clock number:
the action change number set:
to a greatest change number between a change number for the data record on the local machine and a change number for the data record on the remote machine,
the change number for the data record on the local machine generated based on the data record on the local machine being added or modified and generated autonomously from any changes in data in the remote machine, and
the change number for the data record on the remote machine generated based on the data record on the remote machine being added or modified and generated autonomously from any changes in data in the local machine; and
the composite clock number set:
to the maximum anchor based on the action change number of the sync action entry being less than the maximum anchor, and
to the action change number of the sync action entry based on the action change number of the sync action entry being less than an action change number of a subsequent sync action entry and the action change number of the sync action entry being greater than the maximum anchor.

14. The system of claim 13, wherein the sync processor is configured to update one of the sync anchor change numbers with the composite clock number.

15. The system of claim 13, wherein the sync processor is configured to sort the sync action entry by the action change number.

16. The system of claim 13, wherein the sync processor is configured to create a bi-directional sync action queue or a one-way sync action queue.

17. The system of claim 13, wherein the sync processor is configured to:
calculate a maximum clock number;

compare the maximum clock number to the maximum anchor; and end a synchronization if the maximum clock number is less than or equal to the maximum anchor.

18. The system of claim 13, wherein the data store includes the sync action entry determined, at least in part, by a comparison between the maximum anchor and a local record change number, a remote record change number, or a combination thereof.

* * * * *